(12) United States Patent
Wells

(10) Patent No.: US 9,986,621 B2
(45) Date of Patent: May 29, 2018

(54) LIGHTING SYSTEM FOR GROWING PLANTS WHICH PROVIDES A LOCATION INDICATION

(71) Applicant: LUMIGROW, INC., Emeryville, CA (US)

(72) Inventor: Kevin T. Wells, San Rafael, CA (US)

(73) Assignee: LUMIGROW, INC., Emeryville, CA (US)

( * ) Notice: Subject to any disclaimer, the term of this patent is extended or adjusted under 35 U.S.C. 154(b) by 0 days. days.

(21) Appl. No.: 15/004,320

(22) Filed: Jan. 22, 2016

(65) Prior Publication Data
US 2017/0215252 A1 Jul. 27, 2017

(51) Int. Cl.
| | |
|---|---|
| H05B 37/02 | (2006.01) |
| H05B 33/08 | (2006.01) |
| A01G 7/04 | (2006.01) |
| A01G 9/20 | (2006.01) |

(52) U.S. Cl.
CPC ......... H05B 37/0218 (2013.01); A01G 7/045 (2013.01); A01G 9/20 (2013.01); H05B 33/0854 (2013.01); H05B 37/0227 (2013.01); H05B 37/0272 (2013.01)

(58) Field of Classification Search
CPC ............ H05B 37/0227; H05B 37/0234; H05B 37/0254; H05B 37/0281
USPC .................................................. 315/308, 312
See application file for complete search history.

(56) References Cited

U.S. PATENT DOCUMENTS

| | | | | |
|---|---|---|---|---|
| 4,749,916 A | * | 6/1988 | Yamazaki | A01G 7/045 315/254 |
| 2008/0265799 A1 | * | 10/2008 | Sibert | H05B 37/0245 315/292 |
| 2011/0115385 A1 | * | 5/2011 | Waumans | A01G 7/045 315/152 |
| 2012/0126721 A1 | * | 5/2012 | Kuenzler | H05B 37/0272 315/312 |
| 2013/0263503 A1 | * | 10/2013 | Bostdorff | A01G 7/045 47/58.1 LS |
| 2015/0251735 A1 | * | 9/2015 | O'Maley, Jr. | B63B 45/04 362/477 |
| 2016/0064204 A1 | * | 3/2016 | Greenberg | H01J 65/042 315/113 |
| 2016/0088802 A1 | * | 3/2016 | Nicole | A01G 1/001 47/58.1 LS |
| 2016/0113213 A1 | * | 4/2016 | Berinsky | A01G 7/045 47/58.1 LS |
| 2016/0192598 A1 | * | 7/2016 | Haggarty | A01G 7/045 315/297 |
| 2016/0262313 A1 | * | 9/2016 | Szeto | A01G 7/045 |
| 2016/0286732 A1 | * | 10/2016 | Wu | A01G 7/045 |

* cited by examiner

*Primary Examiner* — Tung X Le
(74) *Attorney, Agent, or Firm* — Troutman Sanders LLP

(57) ABSTRACT

A lighting system includes an LED controller, and an LED array which includes first and second LED sub-arrays, wherein the LED array is operatively coupled to the LED controller. The lighting system includes an antenna in communication with the LED controller. First and second wavelength spectrums are provided by the first and second LED sub-arrays, respectively, and are adjustable in response to adjusting an input signal provided to the antenna.

16 Claims, 14 Drawing Sheets

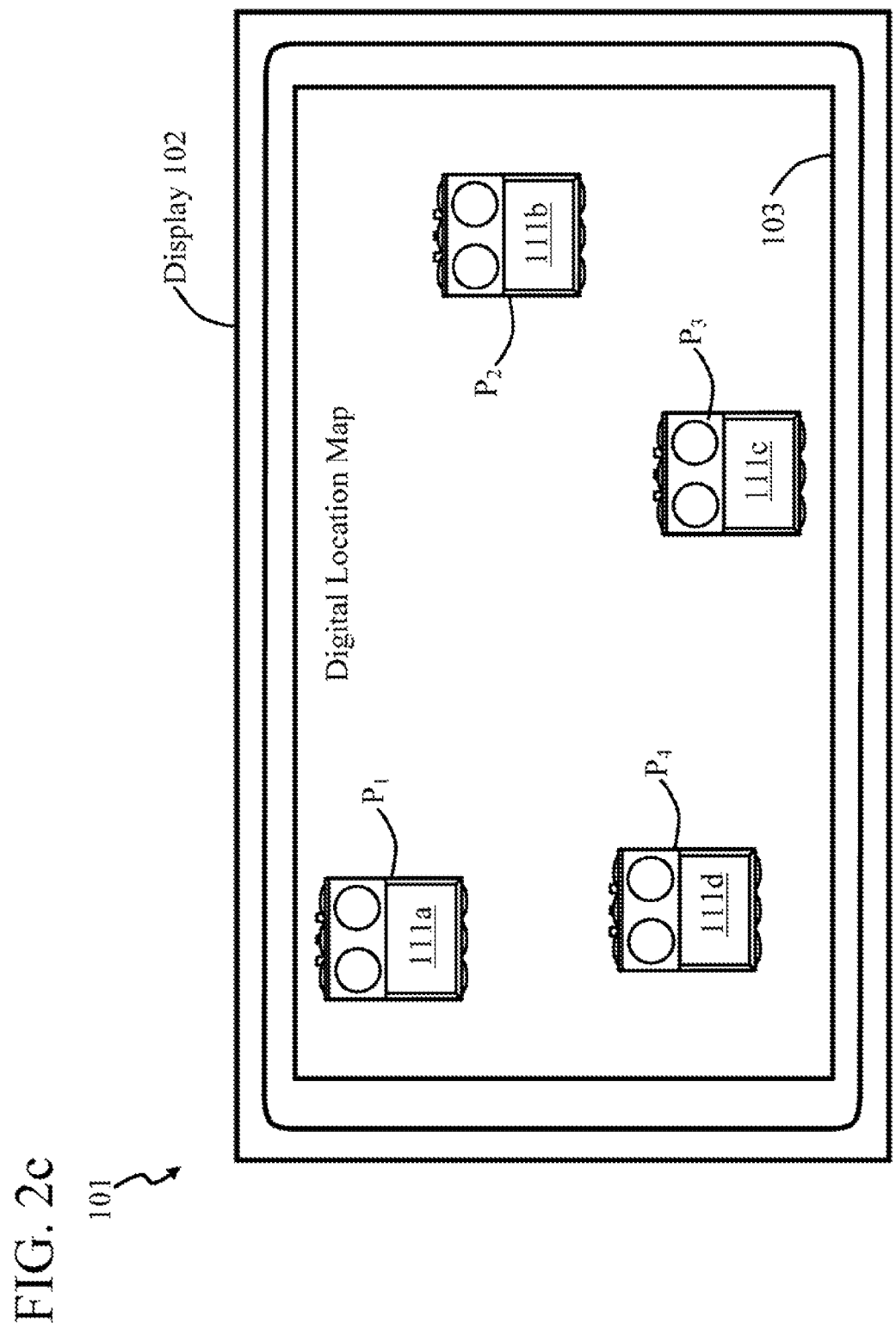

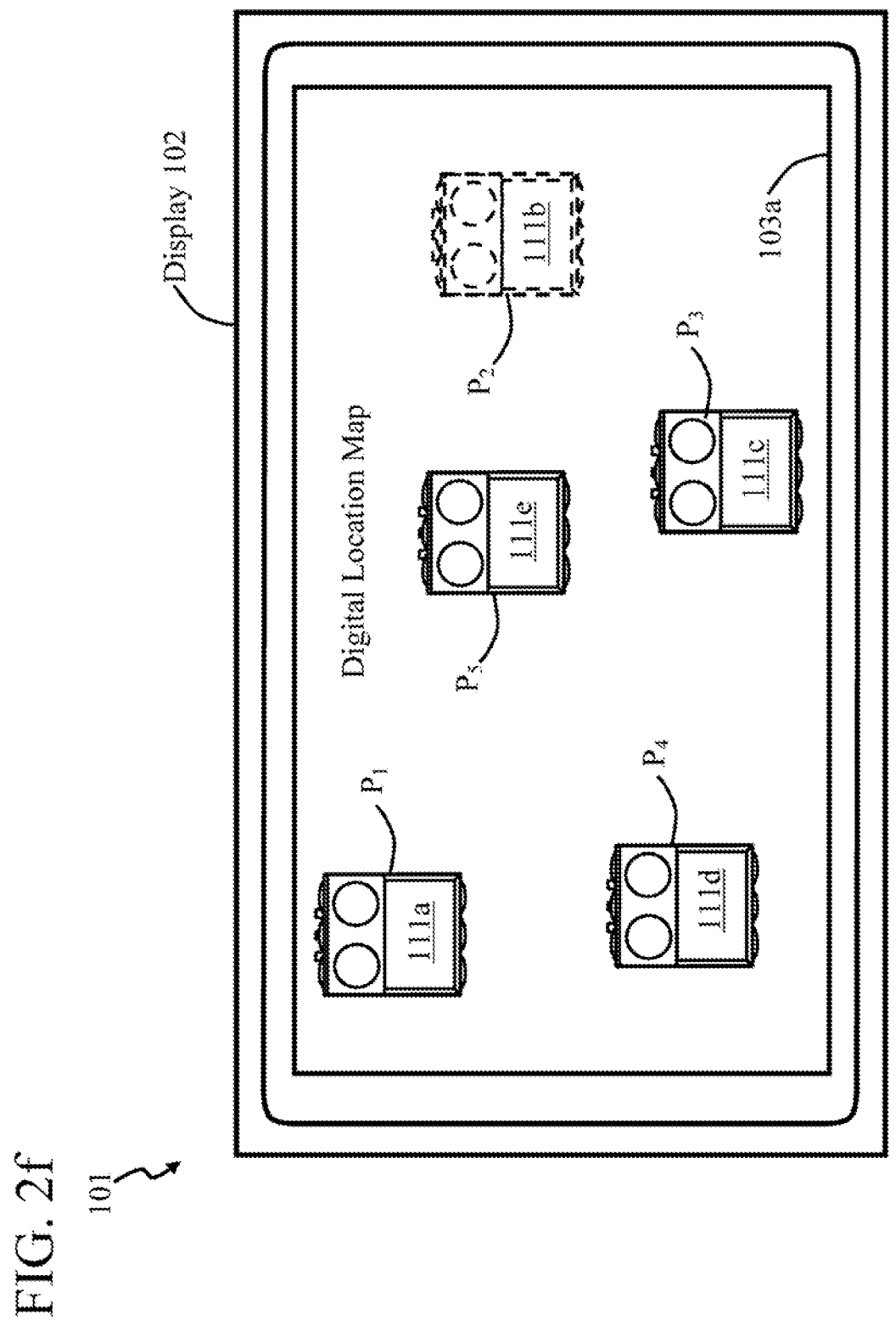

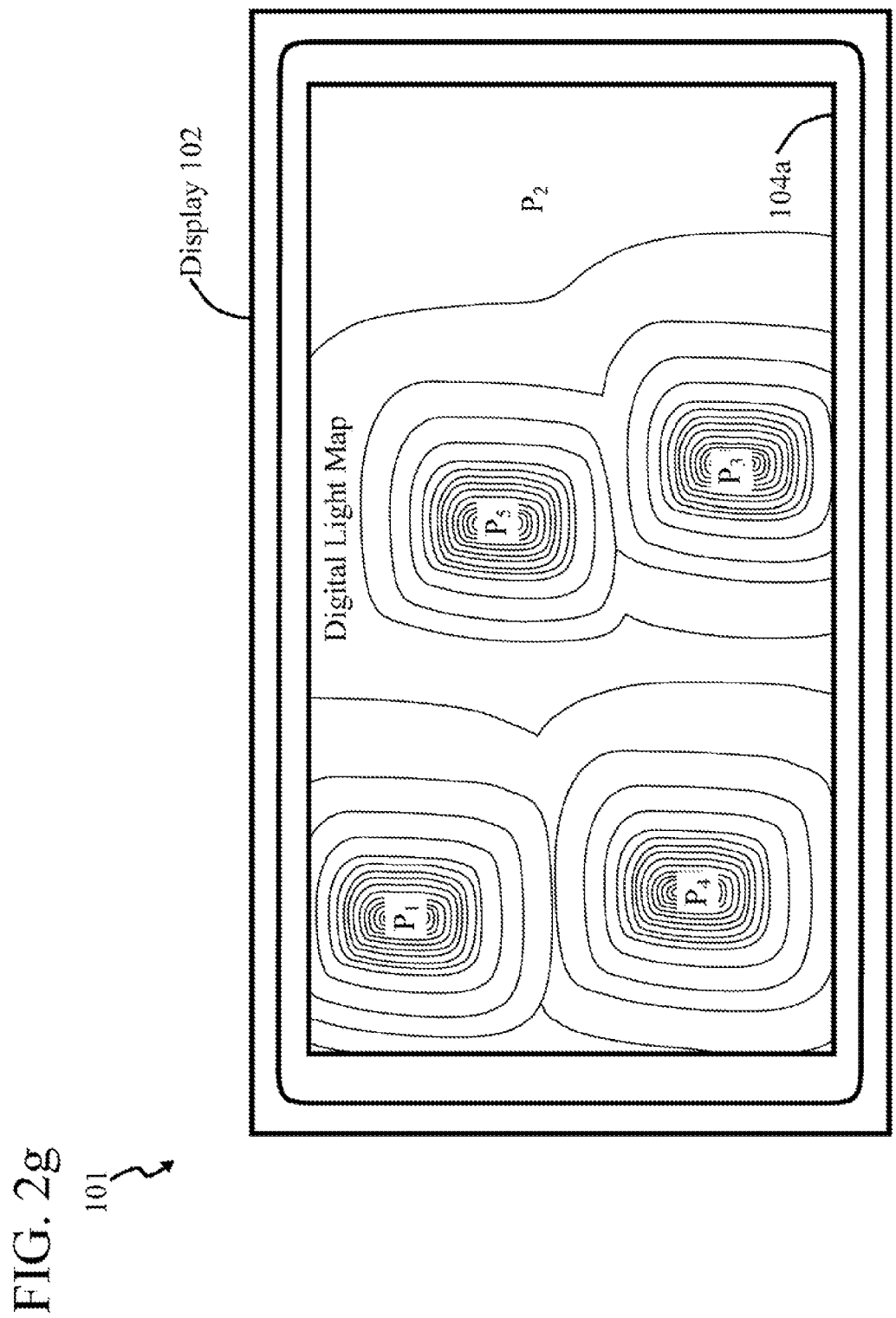

LIGHTING SYSTEM FOR GROWING PLANTS WHICH PROVIDES A LOCATION INDICATION

BACKGROUND OF THE INVENTION

Field of the Invention

This invention relates generally to facilitating plant growth using light.

Description of the Related Art

Some lighting systems for growing plants utilize gas-based lights and other lighting systems utilize light emitting diodes (LEDs). More information regarding lighting systems for growing plants can be found in U.S. Pat. No. 6,688,759 to Hadjimichael, the contents of which is incorporated herein by reference in its entirety. Information regarding lighting systems that utilize LEDs can be found in U.S. Pat. No. 5,012,609 to Ignatius et al., U.S. Pat. No. 5,278,432 to Ignatius et al., U.S. Pat. No. 6,474,838 to Fang et al., U.S. Pat. No. 6,602,275 to Sullivan, U.S. Pat. No. 6,921,182 to Anderson et al., U.S. Patent Application Nos. 20040189555 to Capen et al., 20070058368 to Partee et al., U.S. Patent Application No. 20110125296 to Bucove, et al., U.S. Patent Application No. 20050030538 to Jaffar and International Application No. PCT/CA2007/001096 to Tremblay et al., the contents of all of which are incorporated herein by reference in their entirety.

Other lighting systems are disclosed in U.S. Pat. No. 8,657,463 to Lichten et al., U.S. Pat. No. 8,739,465 to Goeschl, and U.S. Pat. No. 8,826,589 to Goeschl, as well as U.S. Patent Application Nos. 20050030538 to Jaffar et al. and 20080094857 to Smith et al., the contents of all of which are incorporated herein by reference in their entirety.

There are many different manufacturers that use light emitting diodes for the growing of plants. Some of these manufacturers include Homegrown Lights, Inc., which provides the Procyon 100, SuperLED, which provides the LightBlaze 400, Sunshine Systems, which provides the GrowPanel Pro, Theoreme Innovation, Inc., which provides the TI SmartLamp, and HID Hut, Inc., which provides the LED UFO.

However, it is desirable to provide a lighting system which provides an indication of its location.

BRIEF SUMMARY OF THE INVENTION

The present invention is directed to a lighting system for facilitating the growth of plants, wherein the lighting system provides an indication of its location. The novel features of the invention are set forth with particularity in the appended claims. The invention will be best understood from the following description when read in conjunction with the accompanying drawings.

BRIEF DESCRIPTION OF THE DRAWINGS

FIG. 2b is a schematic diagram of the apparatus of FIG. 2a proximate to an area, wherein the apparatus includes the lighting system array of FIG. 2a.

FIG. 2c is a front view of the computer of FIG. 2b, which includes a display displaying a digital location map corresponding to FIG. 2b.

FIG. 2f is a front view of the computer of FIG. 2e, which includes the display of FIG. 2c displaying a digital location map corresponding to FIG. 2e.

FIG. 2g is a front view of the computer of FIG. 2e, which includes the display of FIG. 2c displaying a digital light map corresponding to FIG. 2e.

FIG. 3b is a schematic diagram of the apparatus of FIG. 3a proximate to an area of FIG. 3b, wherein the apparatus includes the lighting system array and light sensory array of FIG. 3a.

DETAILED DESCRIPTION OF THE INVENTION

Figure 1A:
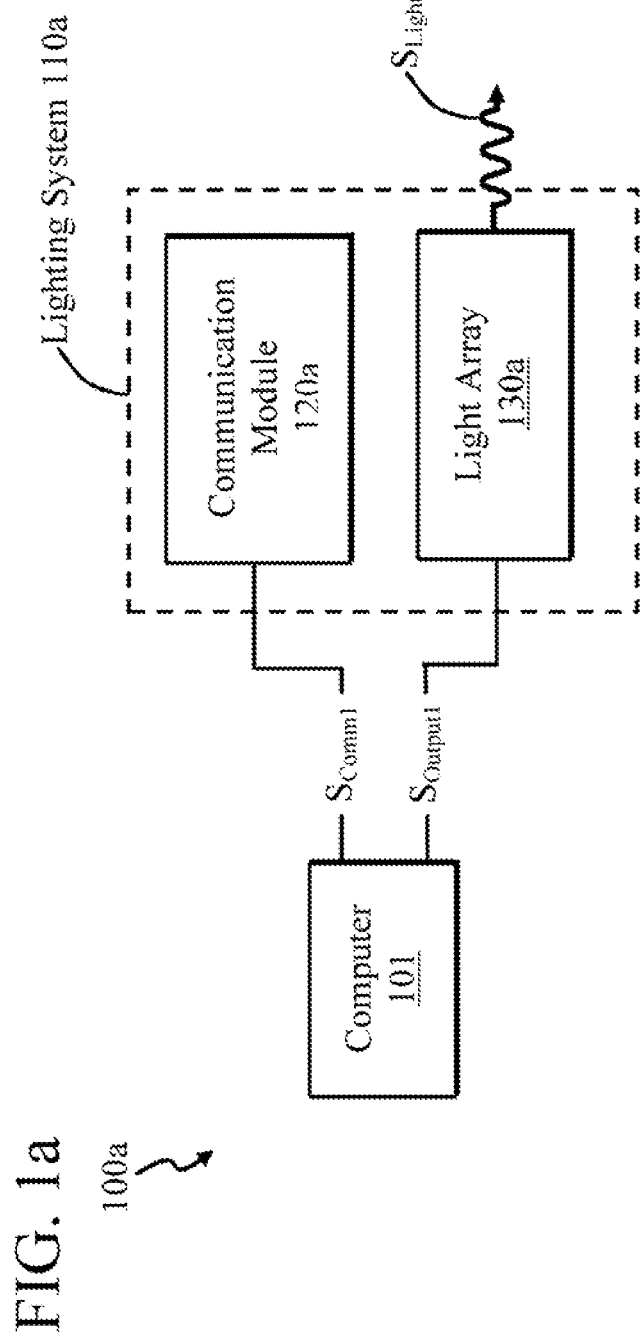
FIG. 1a is a block diagram of an apparatus, which includes a computer and a first lighting system operatively in communication with the computer.

The invention disclosed herein is a lighting system for facilitating the growth of plants, wherein the lighting system provides a position indication of its location. The invention disclosed herein can be understood with reference to U.S. Pat. Nos. 8,297,782 and 8,668,350, the contents of all of which are incorporated herein by reference in their entirety. Further, the invention disclosed herein can be understood with reference to U.S. Patent Application Nos. 20130294065 and 20130293156, the contents of all of which are incorporated herein by reference in their entirety. The position indications discussed herein can be of many different types of indications, such as an electrical signal. The electrical signal of the position indications can be of many different types of electrical signals, such as a digital position signal and analog position signal.

Some embodiments of the invention disclosed herein determine a location parameter. The location parameter typically corresponds to a position, such as a physical position. The location parameters can be of many different types, such as a position coordinate. The position coordinate can include many different types of coordinates, such as a latitude, longitude, and height.

The location parameter can be determined in many different ways, such as by using a positioning chip. The positioning chip can be of several different types. One example of a positioning chip is a Global Positioning System (GPS) chip. More information regarding GPS chips can be found in U.S. Pat. Nos. 7,477,187, 7,592,954, 7,626, 543, 8,330,654, 8,489,124, and U.S. Patent Application No. 20120252482, the contents of all of which are incorporated herein by reference in their entirety. The information of the position coordinate can correspond to the information provided by the GPS chip.

Another example of a positioning chip is a Radio Signal Strength Indicator (RSSI) chip. More information regarding RSSI chips can be found in U.S. Pat. Nos. 7,009,573 and 8,548,497, the contents of all of which are incorporated herein by reference in their entirety. There are several commercially available RSSI chips, such as those manufactured by ANALOG DEVICES of Norwood, Mass. Example RSSI chips provided by ANALOG DEVICES include the AD8306, AD8307, AD8309, AD8310, AD8317. MAXIM INTEGRATED of San Jose, Calif. also provides an RSSI chip. An Example RSSI chip provided by MAXIM INTEGRATED is the MAX2511. More information regarding all of these chips can be found in their corresponding Data Sheets, which are readily available.

The embodiments of the invention disclosed herein can determine the location parameter using triangulation. More information regarding triangulation can be found in U.S. Pat. No. 6,452,544, and U.S. Patent Application Nos. 20120257604 and 20140241189, the contents of all of which are incorporated herein by reference in their entirety. Triangulation can utilize a BLUE TOOTH compliant chip, such as the BlueNRG Low Energy Wireless Network Processor and STLBC01 Low Energy Microcontroller, which are both manufactured by ST Microelectronics of Geneva, Switzerland.

The embodiments of the invention disclosed herein can determine the location parameter by determining a network ping response rate (e.g. pinging). More information regarding pinging can be found in U.S. Pat. Nos. 8,116,783 and 8,731,493, and U.S. Patent Application Nos. 20100150117 and 20140036894, the contents of all of which are incorporated herein by reference in their entirety.

The embodiments of the invention disclosed herein can include a computer, which determines the location parameter of the lighting system. The computer can adjust a light signal provided by the lighting system in response to a control indication that the location parameter has been adjusted. The control indications discussed herein can be of many different types of indications, such as an electrical signal. The electrical signals of the control indications can be of many different types of electrical signals, such as a digital control signal and analog control signal. The computer can adjust the light signal provided by the lighting system by adjusting an output signal, which flows between the computer and the first lighting system. The output signals discussed herein can be of many different types of signals, such as an electrical signal. The electrical signals of the output signals can be of many different types of electrical signals, such as a digital output signal and analog output signal.

The computer can determine the location parameter of the lighting system in many different ways, such as by using a wireless network. The wireless network can be of many different types, such as a wireless mesh network. An example of a wireless mesh network is one that uses a Zigbee module (IEEE 802.15.4). More information regarding Zigbee modules can be found in U.S. Pat. Nos. 7,260,360, 7,957,697, 8,107,513, 8,046,431, the contents of all of which are incorporated herein by reference in their entirety. The wireless network can be a wireless personal area network. An example of a wireless personal area network is one that uses Bluetooth (IEEE 802.15.1). More information regarding Bluetooth modules can be found in U.S. Pat. Nos. 8,565,112, 8,706,032, 8,805.277, 8,615,270, the contents of all of which are incorporated herein by reference in their entirety. It should be noted that the lighting system can have a corresponding Internet Protocol (IP) address to facilitate the identification of the lighting system by the computer.

FIG. 1a is a block diagram of an apparatus 100a, which includes a computer 101 and a first lighting system 110a operatively in communication with the computer 101. In this embodiment, the first lighting system 110a includes a first light array 130a operatively in communication with the computer 101, wherein the first light array 130a is capable of providing a first light signal $S_{Light1}$. The first light array 130a can be of many different types of arrays, such as those disclosed in the above mentioned U.S. Pat. Nos. 8,297,782 and 8,668,350 and U.S. Patent Application Nos. 20130294065 and 20130293156, wherein the light array includes an array of LEDs.

In this embodiment, the first lighting system 100a includes a first communication module 120a in communication with the computer 101. The first communication module 120a can be of many different types of modules. In this embodiment, the first communication module 120a includes a positioning chip (not shown) that provides a position indication of the position thereof. The positioning chip of the first communication module 120a can be of many different types, such as a GPS chip and RSSI chip.

It should be noted that the first communication module 120a is typically positioned proximate to the first light array 130a so that the position of the first communication module 120a corresponds to the position of the first light array 130a. In this way, the position of the first communication module 120a corresponds to the position of the first lighting system 110a.

In this embodiment, the first communication module 120a provides a first location parameter to the computer 101, wherein the first location parameter corresponds to the location of the first lighting system 110a. The first communication module 120a can provide the first location parameter to the computer in many different ways, such as through a wired communication link and a wireless communication link. In this embodiment, the first location parameter is included with a first communication signal $S_{Comm1}$. The first location parameter can be of many different types, such as a position coordinate, which provides the computer 101 with the position indication of the physical position of the first lighting system 110a. The position coordinate can include many different types of information, such as a latitude, longitude, and height. The information of the position coordinate can be provided by the GPS chip.

In one mode of operation, the first location parameter of the first communication module 120a is adjusted in response to adjusting the location of the first lighting system 110a. In this mode of operation, the first location parameter of the first communication module 120a is adjusted in response to adjusting the location of the first light array 130a.

In some embodiments, a wireless network is established proximate to the first lighting system 110a and first communication module 120a. The wireless network establishes communication between the computer 101 and first communication module 120a. Hence, the wireless network can be used to flow the first communication signal $S_{Comm1}$ between the computer 101 and first communication module 120a. In this way, the wireless network can be used to flow the first location parameter to the computer 101. The wireless network can be of many different types, such as those mentioned above.

In this embodiment, the first light array 130a is used to provide the first light signal $S_{Light1}$ to grow a plant (not shown), wherein the computer 101 is provided with the location of the plant. The location of the first lighting system 110a can be adjusted to adjust the position of the first light array 130a relative to the plant. Hence, the first location parameter is adjusted in response to adjusting the position of the first light array 130a relative to the plant. In this way, the computer 101 is provided with the position indication corresponding to the location of the first lighting system 110a relative to the plant.

In another mode of operation, the computer 101 adjusts the first light signal $S_{Light1}$ provided by the first lighting system 110a in response to a first control indication that the first location parameter has been adjusted. In this embodiment, the computer 101 adjusts the first light signal $S_{Light1}$ provided by the first lighting system 110a by adjusting a first output signal $S_{Output1}$. The first output signal $S_{Output1}$ flows between the computer 101 and the first lighting system 110a. In particular, the computer 101 adjusts the first light signal $S_{Light1}$ provided by the first light array 130a in response to the first control indication that the first location parameter has been adjusted. In this embodiment, the computer 101 adjusts the first light signal $S_{Light1}$ provided by the first light array 130a by adjusting the first output signal $S_{Output1}$. The first output signal $S_{Output1}$ flows between the computer 101 and the first light array 130a.

Figure 1B:
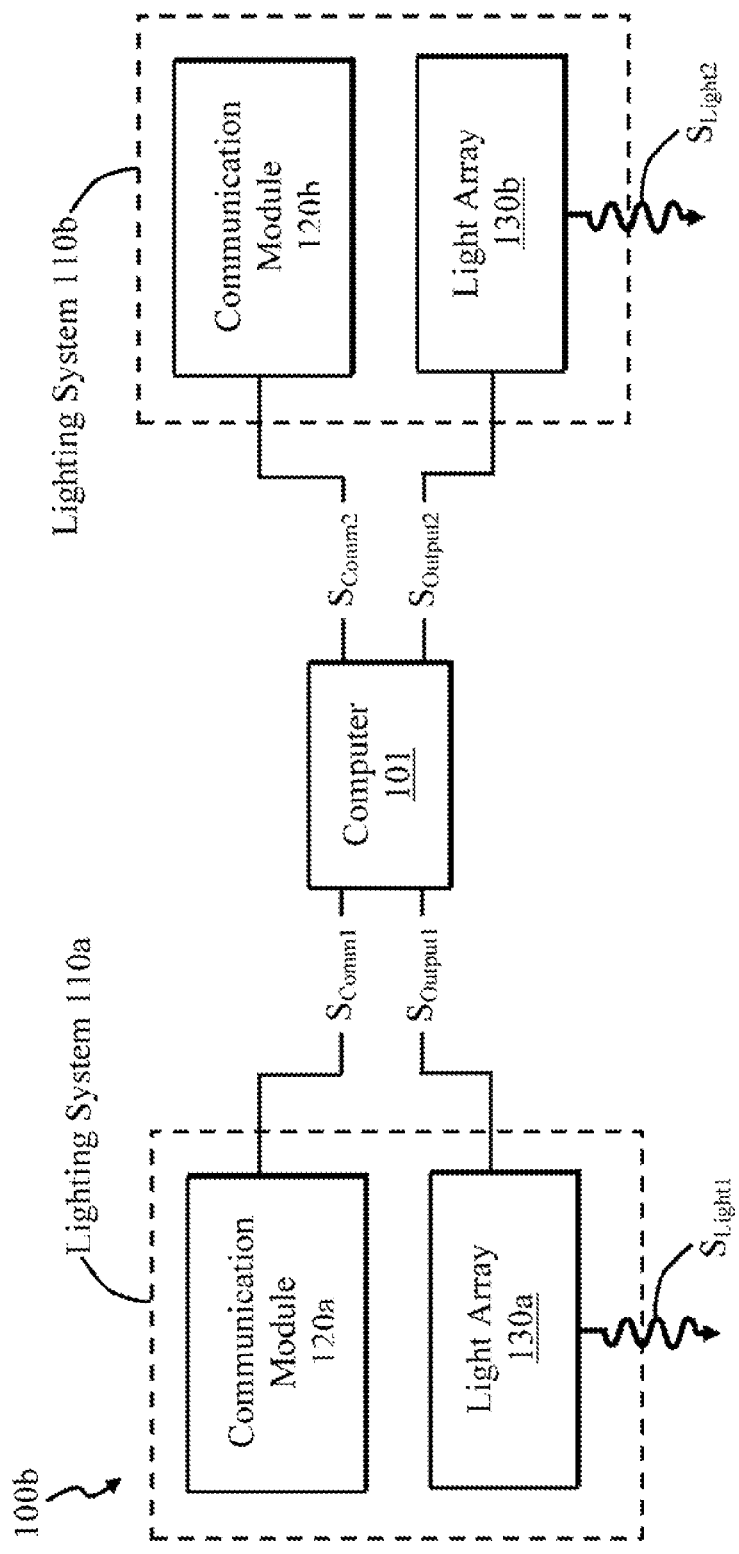
FIG. 1b is a block diagram of another apparatus, which includes the computer and the first lighting system of FIG. 1a, and a second lighting system operatively in communication with the computer.

FIG. 1b is a block diagram of an apparatus 100b, which includes the computer 101 and the first lighting system 110a (FIG. 1a) operatively in communication with the computer 101. In this embodiment, the first lighting system 110a includes the first light array 130a operatively in communication with the computer 101, wherein the first light array 130a is capable of providing the first light signal $S_{Light1}$. The first lighting system 110a includes the first communication module 120a in communication with the computer 101. The first communication module 120a can be of many different types. In this embodiment, the first communication module 120a includes a positioning chip (not shown) that provides an indication of the position thereof. The positioning chip of the first communication module 120a can be of many different types, such as a GPS chip and RSSI chip.

It should be noted that the first communication module 120a is typically positioned proximate to the first light array 130a so that the position of the first communication module 120a corresponds to the position of the first light array 130a. In this way, the position of the first communication module 120a corresponds to the position of the first lighting system 110a.

In this embodiment, the first communication module 120a provides the first location parameter to the computer 101, wherein the first location parameter corresponds to the location of the first lighting system 110a. The first communication module 120a can provide the first location parameter to the computer 101 in many different ways, such as through a wired communication link and a wireless communication link. In this embodiment, the first location parameter is included with the first communication signal $S_{Comm1}$. The first location parameter can be of many different types, such as a position coordinate, which provides the computer 101 with the position indication of the physical position of the first lighting system 110a. The position coordinate can include many different types of information, such as a latitude, longitude, and height. The information of the position coordinate can be provided by the GPS chip.

Further, in this embodiment, the apparatus 100b includes a second lighting system 110b operatively in communication with the computer 101. The second lighting system 110b includes a second light array 130b operatively in communication with the computer 101, wherein the second light array 130b is capable of providing a second light signal $S_{Light2}$. In this embodiment, the second lighting system 110b includes a second communication module 120b in communication with the computer 101. The second communication module 120b can be of many different types. In this embodiment, the second communication module 120b includes a positioning chip (not shown) that provides an indication of the position thereof. The positioning chip of the second communication module 120b can be of many different types, such as a GPS chip and RSSI chip.

It should be noted that the second communication module 120b is typically positioned proximate to the second light array 130b so that the position of the second communication module 120b corresponds to the position of the second light array 130b. In this way, the position of the second communication module 120b corresponds to the position of the second lighting system 110b.

In this embodiment, the second communication module 120b provides a second location parameter to the computer 101, wherein the second location parameter corresponds to the location of the second lighting system 110b. The second communication module 120b can provide the second location parameter to the computer 101 in many different ways, such as through a wired communication link and a wireless communication link. In this embodiment, the second location parameter is included with a second communication signal $S_{Comm2}$. The second location parameter can be of many different types, such as a position coordinate, which provides the computer 101 with the position indication of the physical position of the second lighting system 110b. The position coordinate can include many different types of information, such as a latitude, longitude, and height. The information of the position coordinate can be provided by the GPS chip.

In one mode of operation, the first location parameter of the first communication module 120a is adjusted in response to adjusting the location of the first lighting system 110a. In this mode of operation, the first location parameter of the first communication module 120a is adjusted in response to adjusting the location of the first light array 130a.

Further, the second location parameter of the second communication module 120b is adjusted in response to adjusting the location of the second lighting system 110b. In this mode of operation, the second location parameter of the second communication module 120b is adjusted in response to adjusting the location of the second light array 130b.

In another mode of operation, at least one of the first and second location parameters are adjusted in response to adjusting the location of at least one of the first and second lighting systems 110a and 110b. In this mode of operation, at least one of the first and second location parameters are adjusted in response to adjusting the location of at least one of the first and second light arrays 130a and 130b.

In some embodiments, a wireless network is established proximate to the first and second communication modules 120a and 120b and second lighting systems 110a and 110b. The wireless network establishes communication between the computer 101 and first and second communication modules 120a and 120b. Hence, the wireless network can be used to flow the first and second communication signals $S_{Comm1}$ and $S_{Comm2}$ between the computer 101 and first and second communication modules 120a and 120b. In this way, the wireless network can be used to flow the first and second location parameters to the computer 101. The wireless network can be of many different types, several of which are discussed in more detail above.

As mentioned above, the first light array 130a is used to provide the first light signal $S_{Light1}$ to grow the plant (not shown), wherein the computer 101 is provided with the location of the plant. The location of the first lighting system 110a can be adjusted to adjust the position of the first light array 130a relative to the plant. Hence, the first location parameter is adjusted in response to adjusting the position of the first light array 130a relative to the plant. In this way, the computer 101 is provided with the position indication corresponding to the location of the first lighting system 110a relative to the plant.

Further, the second light array 130b is used to provide the second light signal $S_{Light2}$ to grow the plant (not shown), wherein the computer 101 is provided with the location of the plant. The location of the second lighting system 110b can be adjusted to adjust the position of the second light array 130b relative to the plant. Hence, the second location parameter is adjusted in response to adjusting the position of the second light array 130b relative to the plant. In this way, the computer 101 is provided with the position indication corresponding to the location of the second lighting system 110b relative to the plant.

In one mode of operation, the computer 101 adjusts the first light signal $S_{Light1}$ provided by the first lighting system 110a in response to a first control indication that the first location parameter has been adjusted. In this embodiment, the computer 101 adjusts the first light signal $S_{Light1}$ provided by the first lighting system 110a by adjusting the first output signal $S_{Output1}$. The first output signal $S_{Output1}$ flows between the computer 101 and the first lighting system 110a. In particular, the computer 101 adjusts the first light signal $S_{Light1}$ provided by the first light array 130a in response to the first control indication that the first location parameter has been adjusted. In this embodiment, the computer 101 adjusts the first light signal $S_{Light1}$ provided by the first light array 130a by adjusting the first output signal $S_{Output1}$. The first output signal $S_{Output1}$ flows between the computer 101 and the first light array 130a.

In another mode of operation, the computer 101 adjusts the second light signal $S_{Light2}$ provided by the second lighting system 110b in response to a second control indication that the second location parameter has been adjusted. In this embodiment, the computer 101 adjusts the second light signal $S_{Light2}$ provided by the second lighting system 110b by adjusting a second output signal $S_{Output2}$. The second output signal $S_{Output2}$ flows between the computer 101 and the second lighting system 110b. In particular, the computer 101 adjusts the second light signal $S_{Light2}$ provided by the second light array 130b in response to the second control indication that the second location parameter has been adjusted. In this embodiment, the computer 101 adjusts the second light signal $S_{Light2}$ provided by the second light array 130b by adjusting the second output signal $S_{Output2}$. The second output signal $S_{Output2}$ flows between the computer 101 and the second light array 130b.

In another mode of operation, the computer 101 adjusts at least one of the first and second light signals $S_{Light1}$ and $S_{Light2}$ provided by the corresponding first and second lighting systems 110a and 110b. The first and/or second light signals $S_{Light1}$ and $S_{Light2}$ are adjusted in response to a third control indication that at least one of the first and second location parameters of the corresponding first and second lighting systems 110a and 110b has been adjusted. In some situations, the third control indication includes at least one of the first and second control indications. In particular, the computer 101 adjusts at least one of the first and second light signals $S_{Light1}$ and $S_{Light2}$ provided by the corresponding first and second light arrays 130a and 130b. The first and/or second light signals $S_{Light1}$ and $S_{Light2}$ are adjusted in response to the third control indication that at least one of the first and second location parameters of the corresponding first and second light arrays 130a and 130b has been adjusted. As mentioned above, in some situations, the third control indication includes at least one of the first and second control indications.

Figure 2A:
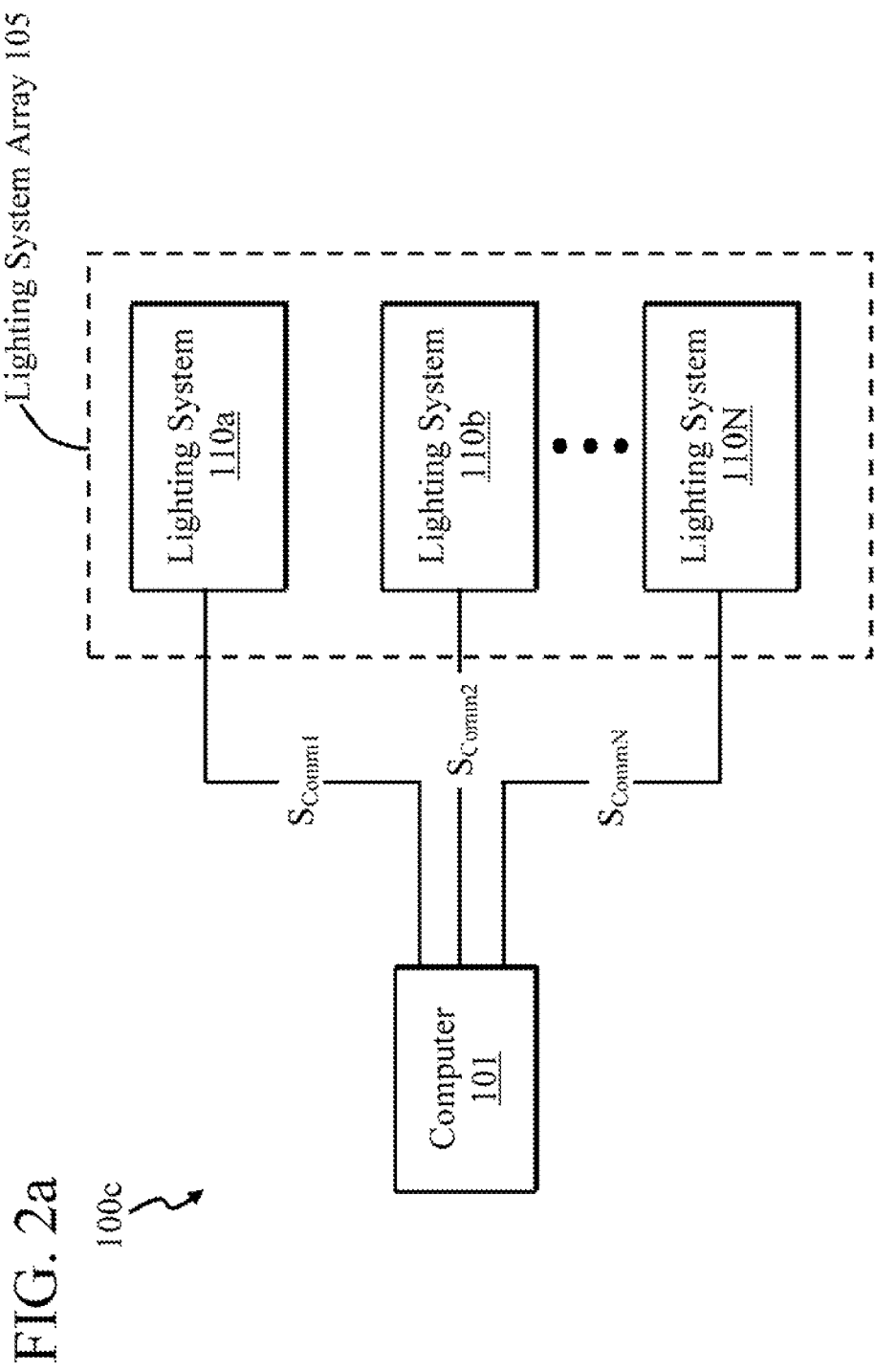
FIG. 2a is a block diagram of an apparatus, which includes the computer of FIG. 1a, and a lighting system array operatively in communication with the computer.
Figure 2B:
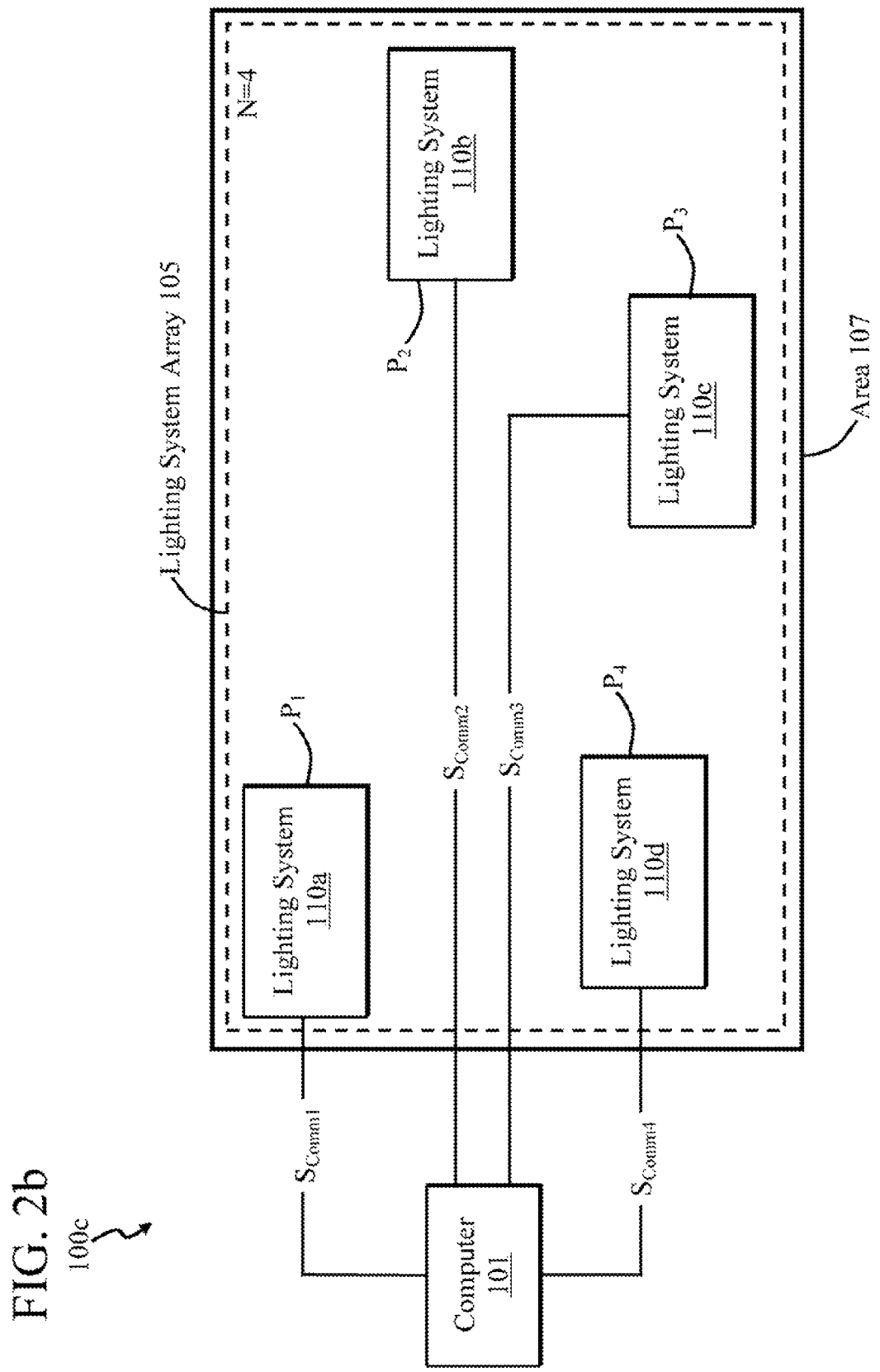

FIG. 2a is a block diagram of an apparatus 100c, and FIG. 2b is a schematic diagram of the apparatus 100c of FIG. 2a proximate to an area 107. The area 107 can correspond to many different types of areas, such as those associated with a grow house and greenhouse. An example of a grow house is a building in which one or more plants are grown inside the building using artificial light, such as light from halogen lamps and/or LEDs. An example of a greenhouse is a building in which one or more plants are grown using at least some natural light. Some greenhouses utilize natural light and artificial light. Examples of greenhouses are provided in U.S. Pat. Nos. 8,915,015, 8,578,650, and 7,228.657, the contents of all of which are incorporated herein by reference in their entirety.

In this embodiment, the apparatus 100c includes the computer 101, and a lighting system array 105 operatively in communication with the computer 101. In this embodiment, the lighting system array 105 includes a plurality of lighting systems, such as the lighting systems 110a and 110b of FIGS. 1a and 1b. It should be noted that the lighting system array 105 can include the lighting systems 110a and 110b, which are discussed in more detail above. The plurality of lighting systems of the lighting system array 105 are denoted as lighting systems 110a, 110b, ..., 110N, wherein N is a whole number greater than one. For example, when N is equal to three (N=3), the lighting system array 105 includes the lighting systems 110a, 110b, and 110c. When N is equal to five (N=5), the lighting system array 105 includes the lighting systems 110a, 110b, 110c, 110d, and 110e. It should be noted that N is equal to four (N=4) in FIG. 2b, so that the apparatus 100c includes the lighting systems 110a, 110b, 110c, and 110d. In general, the lighting system array 105 includes one or more lighting systems.

The lighting systems of FIGS. 2a and 2b include a communication module, such as the first and second communication modules 120a and 120b, as well as a light array, such as the first and second light arrays 130a and 130b. Example communication modules are discussed in more detail above, and an example of the lighting systems of FIGS. 2a and 2b is provided in more detail below.

In this embodiment, the computer 101 determines the location parameter of each lighting system of the lighting system array 105, as shown in FIG. 2b. The location parameter corresponds to the location of a corresponding lighting system of the lighting system array 105, as discussed in more detail above with the first (FIGS. 1a and 1b) and second (FIG. 1b) location parameters. The lighting systems 110a, 110b, 110c, and 110d have first, second, third, and fourth location parameter of $P_1$, $P_2$, $P_3$, and $P_4$, respectively. In this embodiment wherein N is equal to four, the first, second, third, and fourth location parameters $P_1$, $P_2$, $P_3$, and $P_4$ are included with the first, second, third and fourth communication signals $S_{Comm1}$, $S_{Comm2}$, $S_{Comm3}$, and $S_{Comm4}$, respectively. In the embodiment wherein N is equal to three, the first, second, and third location parameters $P_1$, $P_2$, and $P_3$ are included with the first, second, and third communication signals $S_{Comm1}$, $S_{Comm2}$, and $S_{Comm3}$. In the embodiment wherein N is equal to five, the first, second, third, fourth, and fifth location parameters $P_1$, $P_2$, $P_3$, $P_4$, and $P_5$ are included with the first, second, third, fourth, and fifth communication signals $S_{Comm1}$, $S_{Comm2}$, $S_{Comm3}$, $S_{Comm4}$ and $S_{Comm5}$. In general, the $N^{th}$ location parameters $P_1$, $P_2$, ..., $P_N$ are included with the $N^{th}$ communication signals $S_{Comm1}$, $S_{Comm2}$, ..., $S_{CommN}$. It should be noted that the computer 101 can determine the location parameter of the lighting system in many different ways, such as those discussed in more detail above. For example, the computer can determine the location parameter using GPS, RSSI, triangulation and/or pinging.

In one embodiment of the apparatus 100c, the computer 101 determines the location parameter of the lighting systems of the lighting system array 105. For example, in one situation, the computer 101 determines the first location parameter $P_1$ of the first lighting system 110a, wherein the first location parameter $P_1$ is provided to the computer 101 with the first communication signal $S_{Comm1}$. In another situation, the computer 101 determines the second location parameter $P_2$ of the second lighting system 110b, wherein the second location parameter $P_2$ is provided to the computer 101 with the second communication signal $S_{Comm2}$. In another situation, the computer 101 determines the third location parameter $P_3$ of the third lighting system 110c, wherein the third location parameter $P_3$ is provided to the computer 101 with the third communication signal $S_{Comm3}$. In another situation, the computer 101 determines the fourth location parameter $P_4$ of the fourth lighting system 110d, wherein the fourth location parameter $P_4$ is provided to the computer 101 with the fourth communication signal $S_{Comm4}$. In general, the computer determines the $N^{th}$ location parameter $P_N$ of the lighting system 110N, wherein the $N^{th}$ location parameter $P_N$ is provided to the computer with the $N^{th}$ communication signal $S_{CommN}$.

In another embodiment of the apparatus 100c, the computer 101 determines the location parameter of the lighting systems of the lighting system array 105. For example, in one situation, the computer 101 determines the first and third location parameters $P_1$ and $P_3$ of the lighting systems 110a and 110c, wherein the first and third location parameters $P_1$ and $P_3$ are provided to the computer 101 with the first and third communication signals $S_{Comm1}$ and $S_{Comm3}$, respectively. In another situation, the computer 101 determines the second location parameter $P_2$ of the second lighting system 110b, wherein the second location parameter $P_2$ is provided to the computer 101 with the second communication signal $S_{Comm2}$. In another situation, the computer 101 determines the third location parameter $P_3$ of the third lighting system 110c, wherein the third location parameter $P_3$ is provided to the computer 101 with the third communication signal $S_{Comm3}$. In another situation, the computer 101 determines the fourth location parameter $P_4$ of the fourth lighting system 110d, wherein the fourth location parameter $P_4$ is provided to the computer 101 with the fourth communication signal $S_{Comm4}$. In general, the computer 101 determines the $N^{th}$ location parameter of at least one of the lighting systems 110a, 110b, ..., 110N, respectively, wherein the $N^{th}$ location parameter are provided to the computer 101 with the corresponding $N^{th}$ communication signals.

Figure 2D:
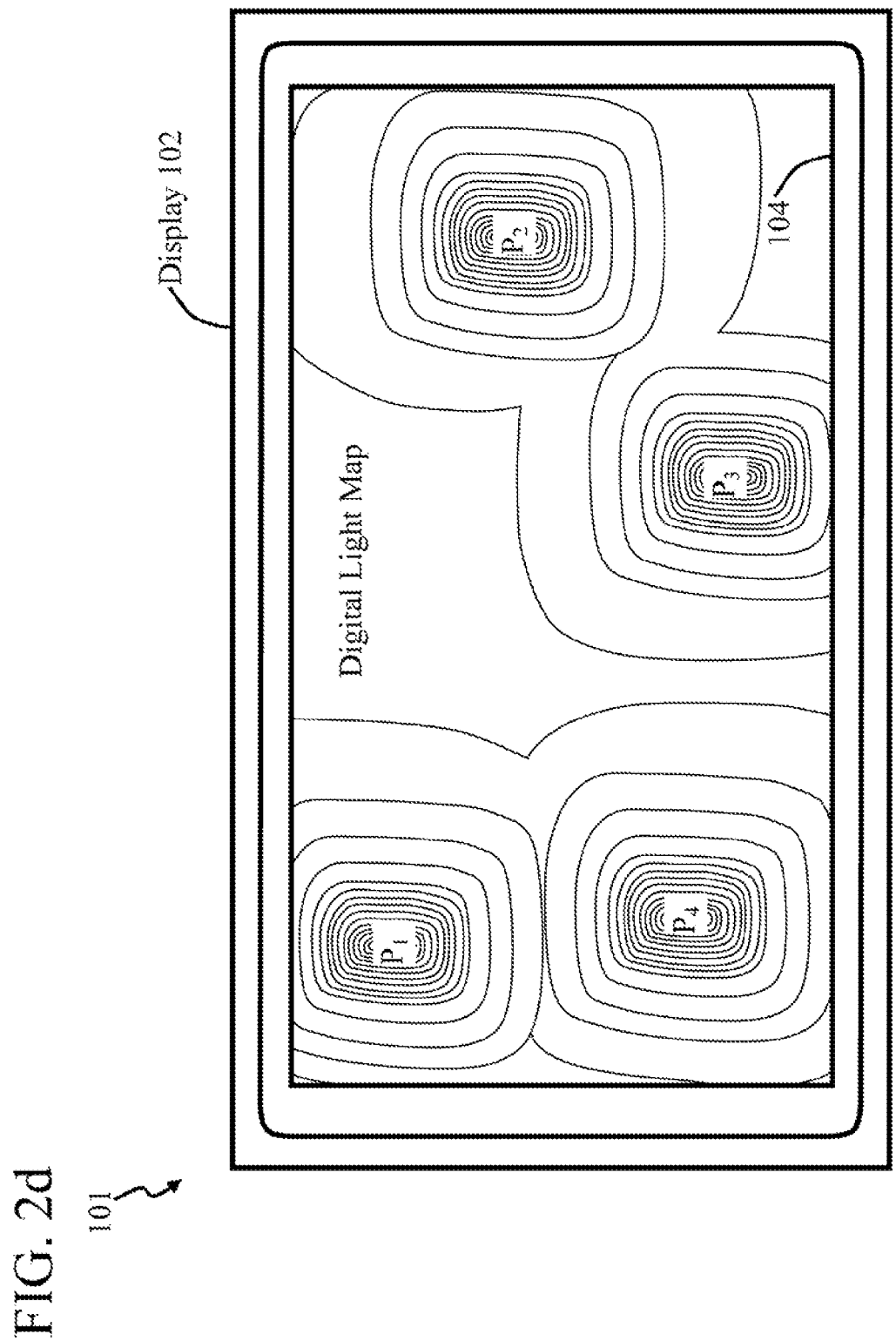
FIG. 2d is a front view of the computer, which includes the display of FIG. 2c displaying a digital light map corresponding to FIG. 2b.
Figure 2E:
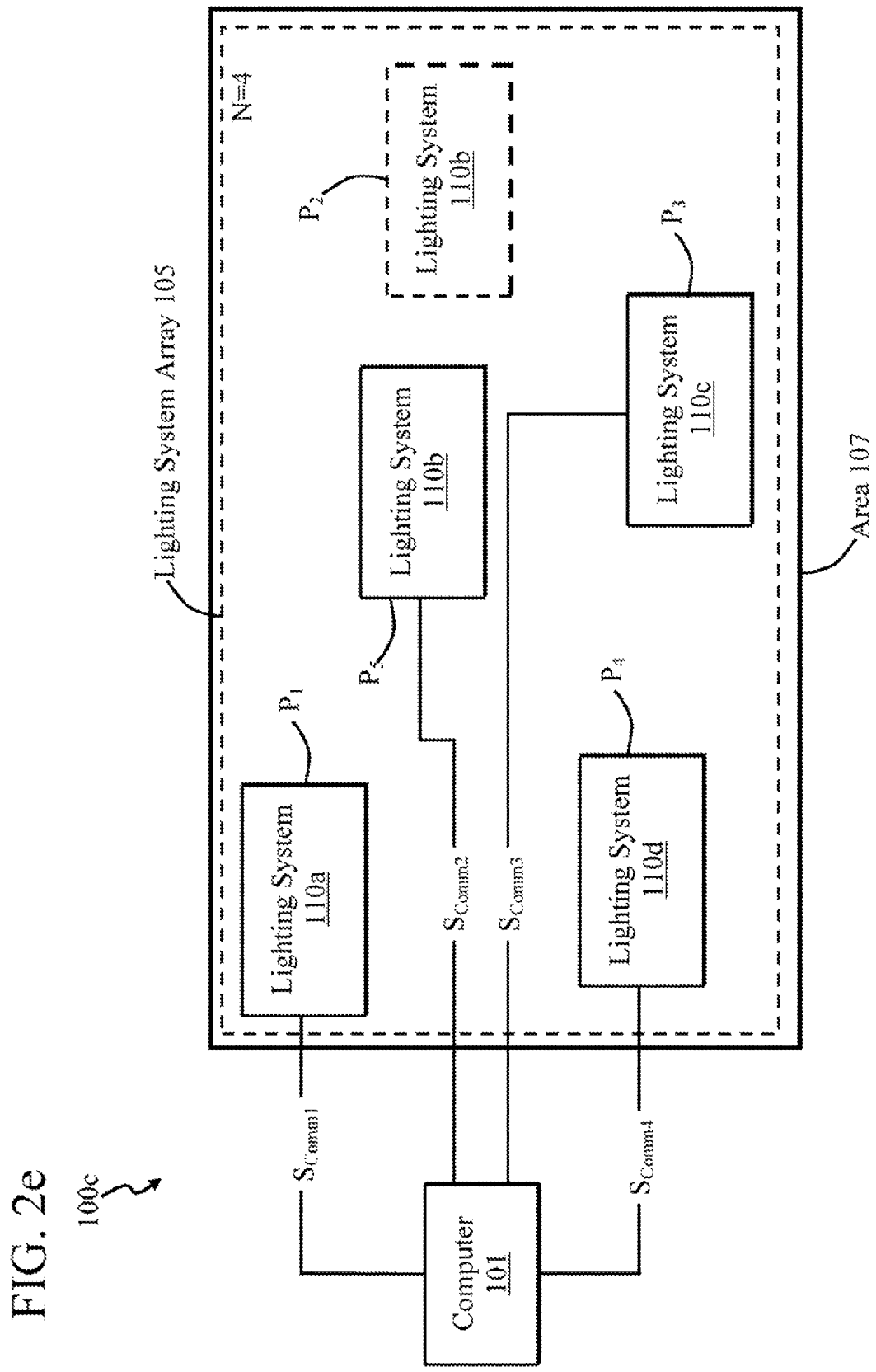
FIG. 2e is a schematic diagram of the apparatus of FIG. 2b proximate to the area of FIG. 2b, wherein a lighting system of the lighting system array has been moved to a different location within the area.

FIG. 2e is a front view of the computer 101 of FIG. 2b, which includes a display 102. The display 102 can be of many different types, such as one typically included with a computer to display an image. The display 102 can also be one typically used with a mobile electronic device, such as a mobile phone and personal digital assistant. An example of a mobile phone is an IPHONE and an example of a personal digital assistant is an IPAD.

In this embodiment, the computer 101 provides a digital location map 103 corresponding to the location parameters discussed in more detail above. The digital location map 103 is displayed by the display 102. The computer 101 can provide the digital location map 103 in many different ways, such as those discussed in more detail above. For example, the computer 101 can determine the location parameter using GPS. RSSI, triangulation and/or pinging.

In this embodiment, the digital location map 103 corresponds to the positioning of the lighting systems 110a, 110b, 110c, and 110b as shown in FIG. 2b, wherein the lighting systems 110a, 110b, 110c, and 110b have first, second, third, and fourth location parameters $P_1$, $P_2$, $P_3$, and $P_4$, respectively. The digital location map 103 includes a first lighting system icon 111a which represents the first lighting system 110a, wherein the first lighting system icon 111a is represented as being at a position corresponding to the first location parameter $P_1$. The digital location map 103 includes a second lighting system icon 111b which represents the second lighting system 110b, wherein the second lighting system icon 111b is represented as being at a position corresponding to the second location parameter $P_2$. The digital location map 103 includes a third lighting system icon 111c which represents the third lighting system 110c, wherein the third lighting system icon 111c is represented as being at a position corresponding to the third location parameter $P_3$. The digital location map 103 includes a fourth lighting system icon 111d which represents the fourth lighting system 110d, wherein the fourth lighting system icon 111d is represented as being at a position corresponding to the fourth location parameter $P_4$.

It should be noted that the lighting system icons 111a, 111b, 111c and 111d are graphical representations of the corresponding lighting systems 110a, 110b, 110c, and 110d. The lighting system icons 111a, 111b, 111c and 111d generally include a pixel, wherein the pixel can include color. The lighting system icons 111a, 111b, 111c, and 111d can have an image file format, such as JPEG, TIFF, and BMP.

FIG. 2d is a front view of the computer 101, which includes the display 102. In this embodiment, the computer 101 provides a digital light map 104 corresponding to the location parameters discussed in more detail above. The digital light map 104 is displayed by display 102.

The computer 101 can provide the digital light map 104 in many different ways. In this embodiment, the digital light map 104 corresponds to the positioning of the lighting systems 110a, 110b, 110c, and 110b as shown in FIG. 26, wherein the lighting systems 110a, 110b, 110c, and 110b have first, second, third, and fourth location parameters $P_1$, $P_2$, $P_3$, and $P_4$, respectively. The digital light map 104 includes contour lines which represent the intensity of light provided by the lighting systems 110a, 110b, 110c, and 110b. For example, the number and density of contour lights proximate to first location parameter $P_1$ represents the intensity of light provided by the first lighting system 110a. The number and density of contour lights proximate to the second location parameter $P_2$ represents the intensity of light provided by the second lighting system 110b. The number and density of contour lights proximate to the third location parameter $P_3$ represents the intensity of light provided by the third lighting system 110c. The number and density of contour lights proximate to the fourth location parameter $P_4$ represents the intensity of light provided by the fourth lighting system 110d.

The contour lines can be determined by the computer 101 in many different ways, several of which are discussed in more detail below. The computer 101 can be in communication with a light sensor which provides light intensity information. Software operating on the computer 101 can use the light intensity information provided by the light sensor to provide the contour lines. There are many different types of software that can be used, such as imaging software. Some examples of imaging software that can be used include PROSOURCE for light source modeling and TRACEPRO. Other types of software that can be used include building design software. Building design software is generally used to determine the lighting requirements of a building. Some examples of building design software include ECOTECT, RELUX, and RADIANCE. In this way, the computer 101 provides the digital light map 104 corresponding to the amount of light provided by the lighting system array 105.

It should be noted that the digital light map 104 can be driven to a desired digital light map in response to adjusting the location of a lighting system of the lighting system array 105. This feature will be discussed in more detail with FIGS. 2e, 2f and 2g below.

FIG. 2e is a schematic diagram of the apparatus 100c of FIG. 2b proximate to the area 107, wherein the second lighting system 110b has been moved so it has a fifth location parameter $P_5$. It should be noted that the fifth location parameter $P_5$ is not equal to the second location parameter $P_2$ (FIG. 2b) because the second lighting system 110b of FIG. 2e is at a different location than the second lighting system 110b of FIG. 2b. It should also be noted that the second lighting system 110b of FIG. 2b is shown in phantom in FIG. 2e for illustrative purposes and to show the difference between the first and fifth location parameters $P_2$ and $P_5$. In this embodiment, the computer 101 determines the location parameter of each lighting system of the lighting system array 105, as discussed in more detail above.

FIG. 2f is a front view of the computer 101 of FIG. 2e, which includes the display 102. In this embodiment, computer 101 provides a digital location map 103a. In this embodiment, the digital location map 103a corresponds to the positioning of lighting systems 110a, 110b, 110c, and 110d as shown in FIG. 2e, wherein the lighting systems 110a, 110b, 110c, and 110d have the first, second, third, and fourth location parameters $P_1$, $P_5$, $P_3$, and $P_4$, respectively. The digital location map 103a includes the first lighting system icon 111a which represents the first lighting system 110a, wherein the first lighting system icon 111a is represented as being at a position corresponding to the first location parameter $P_1$. The digital location map 103a includes a fifth lighting system icon 111e which represents the second lighting system 110b, wherein the second lighting system icon 111b is represented as being at a position corresponding to fifth location parameter $P_5$. The digital location map 103a includes the third lighting system icon 111c which represents the third lighting system 110c, wherein the third lighting system icon 111c is represented as being at a position corresponding to the third location parameter $P_3$. The digital location map 103a includes the fourth lighting system icon 111d which represents the fourth lighting system 110d, wherein the fourth lighting system icon 111d is represented as being at a position corresponding to the fourth location parameter $P_4$.

As discussed in more detail above with FIG. 2e, the fifth location parameter $P_5$ corresponds to the new location of the second lighting system 110b. The second lighting system 110b is represented by the fifth lighting system icon 111e to indicate that it is at the new location. It should also be noted that the second lighting system icon 111b of FIG. 2b is shown in phantom in FIG. 2f for illustrative purposes and to show the difference between the second and fifth location parameters $P_2$ and $P_5$. In this way, the digital location map 103 (FIG. 2c) is adjusted, to provide the digital location map 103a, in response to adjusting the location of a lighting system of the lighting system array 105.

FIG. 2g is a front view of the computer 101 of FIG. 2e, which includes the display 102. In this embodiment, the computer 101 provides a digital light map 104a corresponding to the location parameters discussed in more detail above with FIGS. 2e and 2f. The digital light map 104a is displayed by display 102.

As mentioned above with FIG. 2d, the computer 101 can provide the digital light map 104a in many different ways. In this embodiment, the digital light map 104a corresponds to the positioning of lighting systems 110a, 110b, 110c, and 110d as shown in FIG. 2f, wherein the lighting systems 110a, 110b, 110c, and 110d have the first, second, third, and fourth location parameters $P_1$, $P_5$, $P_3$, and $P_4$, respectively. The digital light map 104a includes contour lines which represent the intensity of light provided by the lighting systems 110a, 110b, 110c, and 110d. For example, the number and density of contour lights proximate to the first location parameter $P_1$ represents the intensity of light provided by the first lighting system 110a. The number and density of contour lights proximate to the fifth location parameter $P_5$ represents the intensity of light provided by the second lighting system 110b. The number and density of contour lights proximate to the third location parameter $P_3$ represents the intensity of light provided by the third lighting system 110c. The number and density of contour lights proximate to the fourth location parameter $P_4$ represents the intensity of light provided by the fourth lighting system 110d. In this way, the amount of light provided by a lighting system of the lighting system array 105 is adjusted in response to adjusting a selected location parameter.

As mentioned above with FIG. 2d, the digital light map 104 can be driven to a desired digital light map in response to adjusting the location of a lighting system of the lighting system array 105. It should be noted that the location parameter of the lighting system corresponds to the location of a corresponding lighting system. The location parameter of the lighting system is adjusted in response to adjusting the location of the corresponding lighting system. Hence, the digital light map can be driven to the desired digital light map in response to adjusting the location parameter of the lighting system.

For example, in FIGS. 2e and 2f, the second lighting system 110b has been moved from the location corresponding to the second location parameter $P_2$ to the location corresponding to the fifth location parameter $P_5$. In this way, the digital light map 104 has been driven to the desired digital light map 104a, in response to adjusting the location of the second lighting system 110b of the lighting system array 105.

Figure 2H:
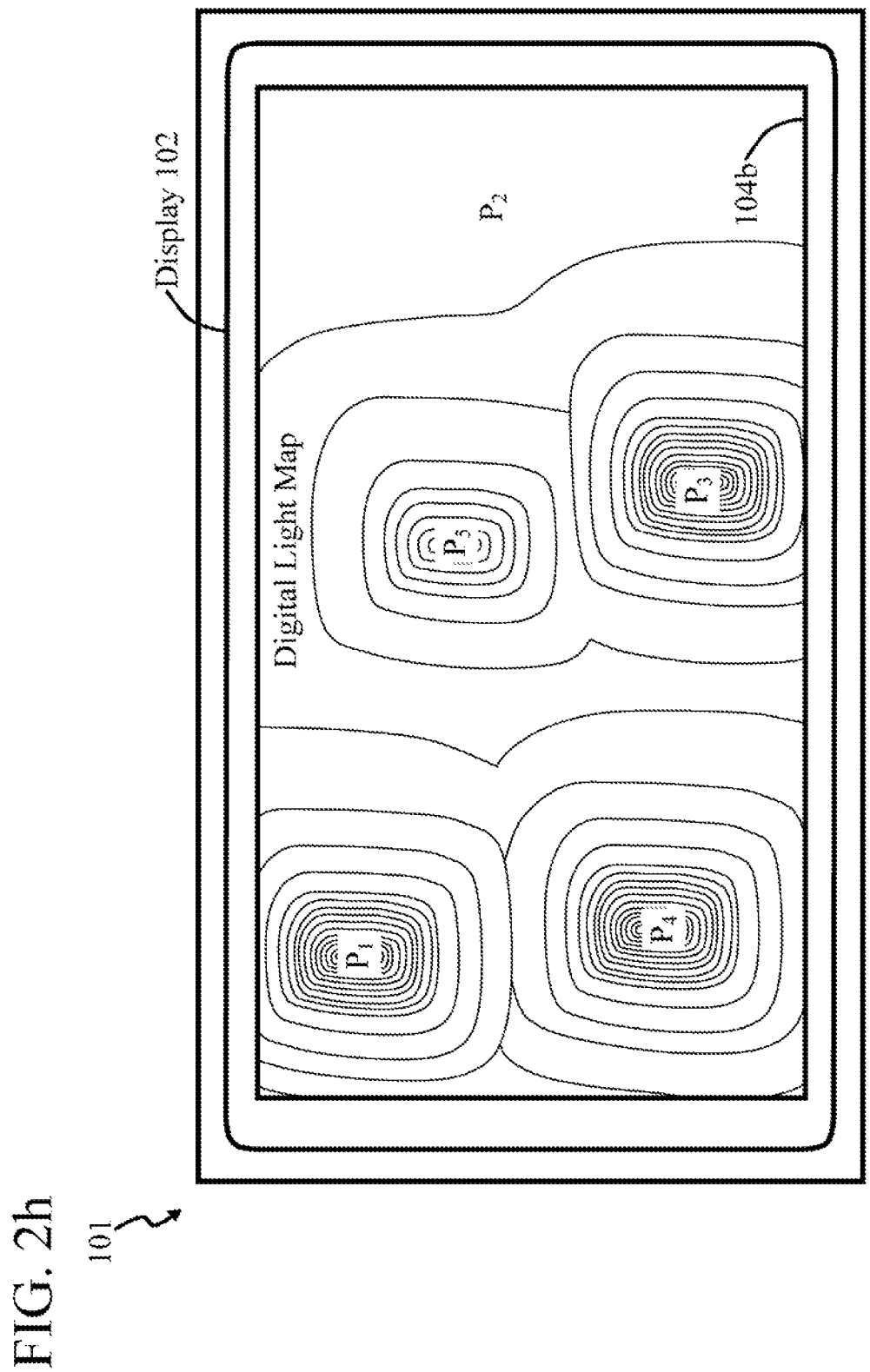
FIG. 2h is a front view of the computer of FIG. 2e, which includes the display of FIG. 2c displaying another digital light map.

FIG. 2h is a front view of the computer 101 of FIG. 2e, which includes the display 102. In this embodiment, the computer 101 provides a digital light map 104b corresponding to the location parameters discussed in more detail above with FIGS. 2e and 2f. The digital light map 104b is displayed by display 102. The number and/or density of contour lines are adjustable in response to adjusting the amount of light (e.g. light intensity) provided by a lighting system of lighting system array 105. In this situation, the amount of light provided by the second lighting system 110b has been adjusted, and the corresponding number and density of contour lines indicated by the fifth location parameter $P_5$ have been adjusted in response. The number and density of contour lines increases in response to increasing the amount of light provided by the corresponding lighting system. Further, the number and density of contour lines decreases in response to decreasing the amount of light provided by the corresponding lighting system. It should be noted that, in this situation (FIG. 2h), the number and density of contour lines indicated by the fifth location parameter $P_5$ have been reduced because the amount of light provided by the second lighting system 110b has been reduced. However, in other situations, the number and density of contour lines indicated by the fifth location parameter $P_5$ will be increased in response to increasing the amount of light provided by the second lighting system 110b. The same is true for the other lighting systems of lighting system array 105, such as lighting systems 110a, 110c, and 110d. In this way, the computer 101 provides a digital light map corresponding to the amount of light provided by the lighting system array 105.

Figure 3A:
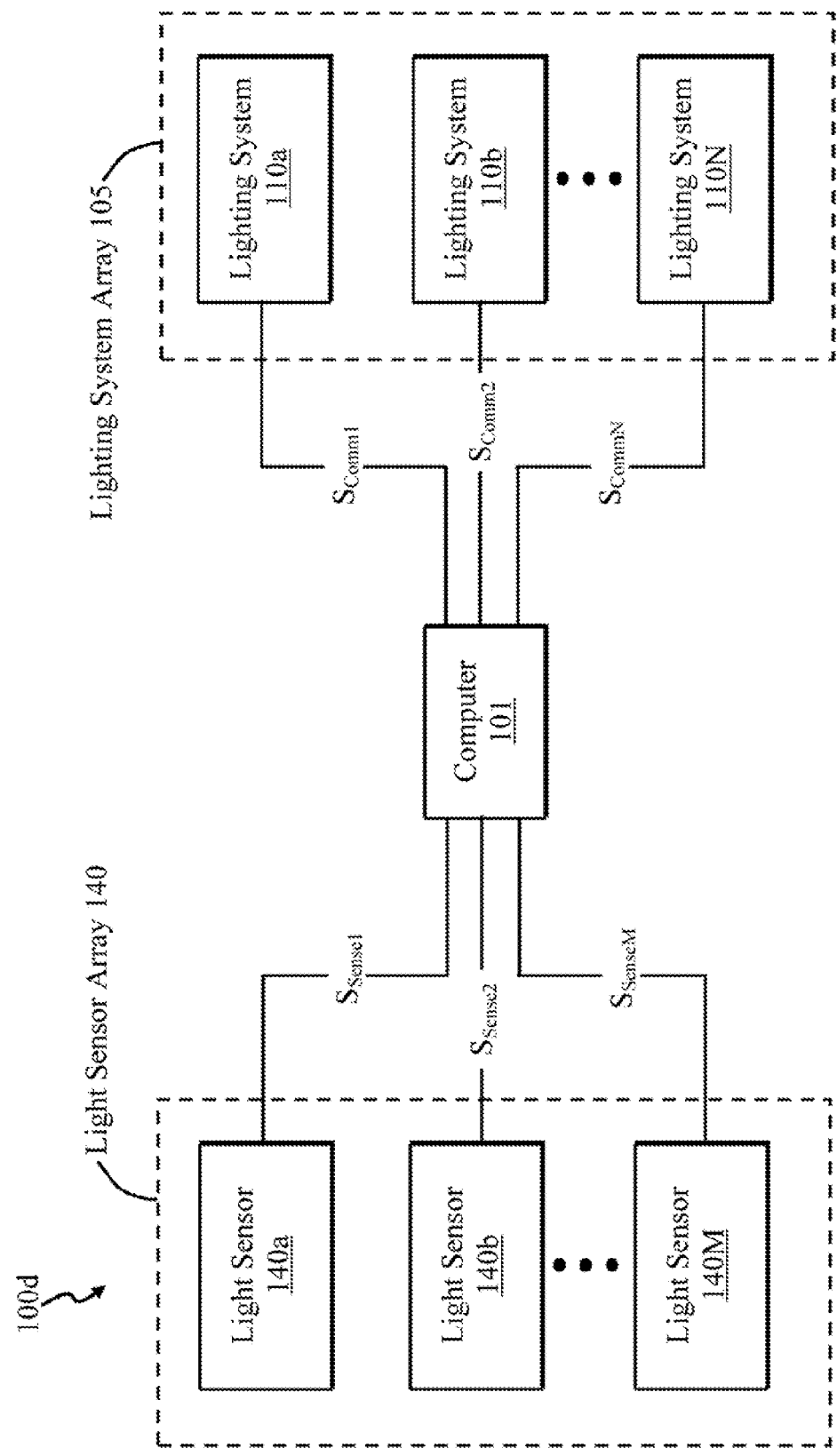
FIG. 3a is a block diagram of an apparatus, which includes the lighting system array of FIG. 2a and a light sensor array operatively coupled to the computer.
Figure 3B:
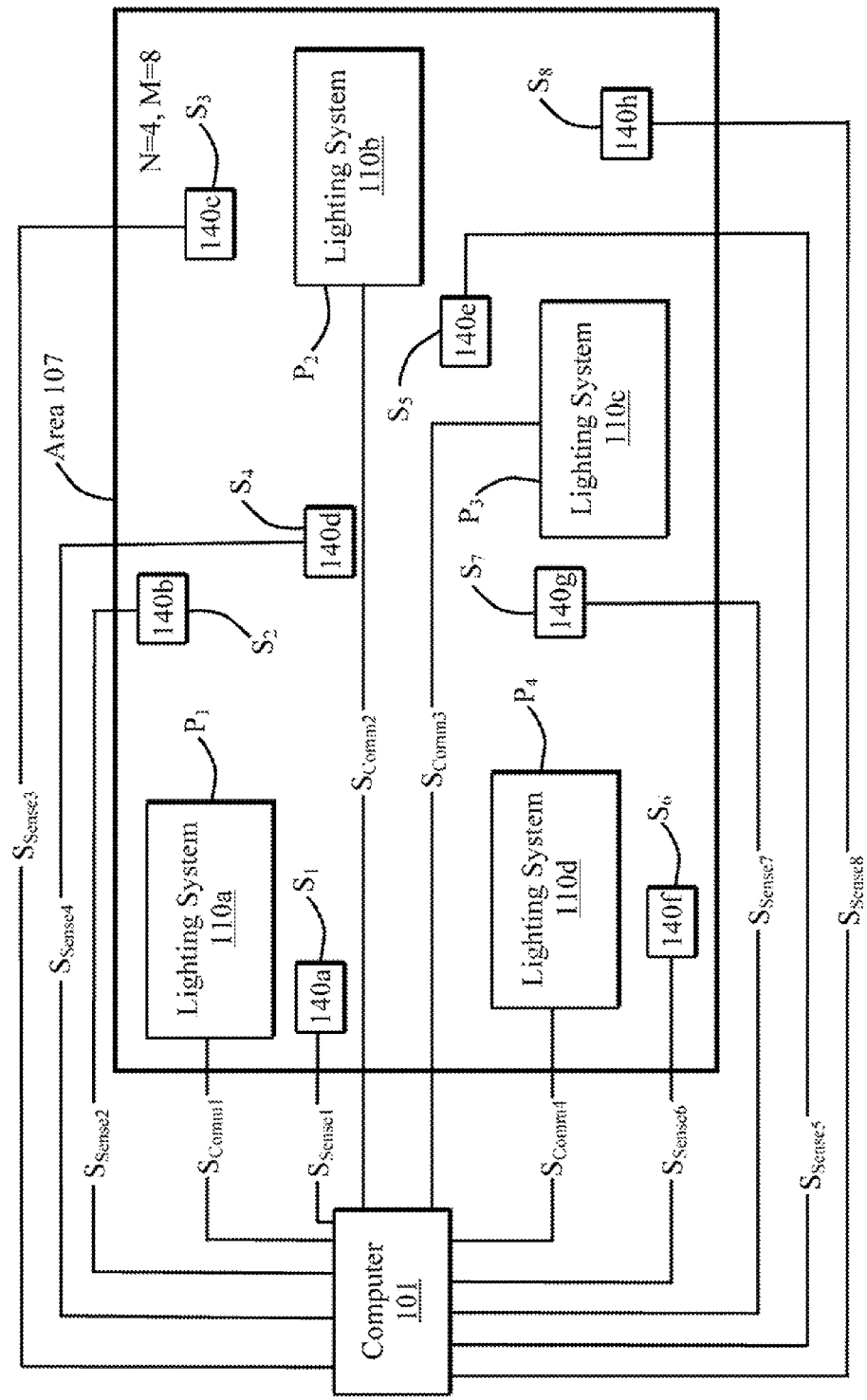

FIG. 3a is a block diagram of an apparatus 100d, and FIG. 3b is a schematic diagram of the apparatus 100d of FIG. 3a proximate to the area 107. Information regarding the area 107 is provided in more detail above.

In this embodiment, the apparatus 100d includes the computer 101, and the lighting system array 105 operatively in communication with the computer 101. Information regarding the lighting system array 105 is provided in more detail above. It should be noted that N is equal to four (N=4) in FIG. 3b, so that the apparatus 100d includes the lighting systems 110a, 110b, 110c, and 110d. As discussed in more detail above, the lighting systems include a communication module, such as the first and second communication modules 120a and 120b, as well as a light array, such as the first and second light arrays 130a and 130b.

In this embodiment, the computer 101 determines the location parameter of each lighting system of the lighting system array 105. As shown in FIG. 3b, the location parameters for lighting systems 110a, 110b, 110c, and 110d are the first, second, third, and fourth location parameters $P_1$, $P_2$, $P_3$, and $P_4$, respectively. Information regarding the location parameter, and determining the location parameter, is provided in more detail above.

In one embodiment of the apparatus 100d, the computer 101 determines a location parameter of the lighting systems of the lighting system array 105. For example, in one situation, the computer 101 determines the first location parameter $P_1$ of the first lighting system 110a, wherein the first location parameter $P_1$ is provided to the computer 101 with the first communication signal $S_{Comm1}$. In another situation, the computer 101 determines the second location parameter $P_2$ of the second lighting system 110b, wherein the second location parameter $P_2$ is provided to the computer 101 with the second communication signal $S_{Comm2}$. In another situation, the computer 101 determines the third location parameter $P_3$ of the third lighting system 110c, wherein the third location parameter $P_3$ is provided to the computer 101 with the third communication signal $S_{Comm3}$. In another situation, the computer 101 determines the fourth location parameter $P_4$ of the fourth lighting system 110d, wherein the fourth location parameter $P_4$ is provided to the computer 101 with the fourth communication signal $S_{Comm2}$. In general, the computer determines the $N^{th}$ location parameter $P_N$ of the lighting system 110N, wherein the $N^{th}$ location parameter $P_N$ is provided to the computer with the $N^{th}$ signal $S_{CommN}$.

In another embodiment of the apparatus 100d, the computer 101 determines the location parameter of at least one of the lighting systems of the lighting system array 105. For example, in one situation, the computer 101 determines the first and third location parameters $P_1$ and $P_3$ of the lighting systems 110a and 110c, wherein the first and third location parameters $P_1$ and $P_3$ are provided to the computer 101 with the first and third communication signals $S_{Comm1}$ and $S_{Comm3}$, respectively. In another situation, the computer 101 determines the second location parameter $P_2$ of the second lighting system 110b, wherein the second location parameter $P_2$ is provided to the computer 101 with the second communication signal $S_{Comm2}$. In another situation, the computer 101 determines the third location parameter $P_3$ of the third lighting system 110c, wherein the third location parameter $P_3$ is provided to the computer 101 with the third communication signal $S_{Comm3}$. In another situation, the computer 101 determines the fourth location parameter $P_4$ of the fourth lighting system 110d, wherein the fourth location parameter $P_4$ is provided to the computer 101 with the fourth communication signal $S_{Comm4}$. In general, the computer 101 determines the $N^{th}$ location parameter $P_1, P_2, \ldots, P_N$ of at least one of the lighting systems 110a, 110b, . . . , 110N, respectively, wherein the $N^{th}$ locations parameters are provided to the computer 101 with the corresponding $N^{th}$ communication signals.

As mentioned above, the computer 101 can be in communication with a light sensor which provides light intensity information. In this embodiment, the apparatus 100d includes a light sensor array 140 (FIG. 3a), wherein the light sensor array 140 is in communication with the computer 101. The light sensor array 140 determines the amount of light proximate to the area 107. Light proximate to the area 107 includes light in the area 107. The light proximate to the area 107 typically includes the light provided by the lighting system array 105. In this way, the light sensor array 140 determines the amount of light provided by the lighting system array 105. The light proximate to the area 107 can also include ambient light, such as sunlight and light from remote sources. An example of a remote source is a light source positioned away from the area 107.

In general, the light sensor array 140 includes one or more light sensors. In this embodiment, the light sensor array 140 includes a plurality of light sensors, which are denoted as light sensors 140a, 140b, . . . , 140M (FIG. 3a), wherein M is a whole number greater than one. For example, when M is equal to three (M=3), the light sensor array 140 includes the first, second, and third light sensors 140a, 140b, and 140c. When M is equal to five (M=5), the light sensor array 140 includes the first, second, third, fourth, and fifth light sensors 140a, 140b, 140c, 140d, and 140e. It should be noted that M is equal to eight (M=8) in FIG. 3b, so that the apparatus 100d includes the first, second, third, fourth, fifth, sixth, seventh, and eighth light sensors 140a, 140b, 140c, 140d, 140e, 140f, 140g, and 140h.

As mentioned above, software operating on the computer 101 can use the light intensity information provided by the light sensor array 140 to provide contour lines. Hence, in this embodiment, the computer 101 of the apparatus 100d can use the light intensity information provided by the $M^{th}$ light sensors 140a, 140b, . . . , 140M (FIG. 3a) to provide contour lines (FIG. 3d). It should be noted that the contour lines are displayed by the display 102.

The light intensity information can be provided by the light sensory array 140 to the computer 101 in many different ways. In this embodiment, the $M^{th}$ light sensors 140a, 140b, . . . , 140M of the light sensor array 140 each provide a sense signal to the computer in response to receiving light. In particular, the first light sensor 140*a* provides a first sense signal $S_{Sense1}$ to the computer 101 in response to receiving light. The second light sensor 140*b* provides a second sense signal $S_{Sense2}$, to the computer 101 in response to receiving light. In general, the light sensor 140M provides an $M^{th}$ sense signal $S_{SenseM}$ to the computer 101 in response to receiving light. In the particular embodiment of FIG. 3*b*, the first, second, third, fourth, fifth, sixth, seventh, and eighth light sensors 140*a*, 140*b*, 140*c*, 140*d*, 140*e*, 140*f*, 140*g*, and 140*h* provide the first, second, third, fourth, fifth, sixth, seventh, and eighth sense signals $S_{Sense1}$, $S_{Sense2}$, $S_{Sense3}$, $S_{Sense4}$, $S_{Sense5}$, $S_{Sense6}$, $S_{Sense7}$, and $S_{Sense8}$, respectively.

In this embodiment, the computer 101 determines a location parameter of each light sensor of the light sensor array 140. The location parameter corresponds to the location of a corresponding light sensor of the light sensor array 140. For example, in as shown in FIG. 3*b*, the first, second, third, fourth, fifth, sixth, seventh, and eighth light sensors 140*a*, 140*b*, 140*c*, 140*d*, 140*e*, 140*f*, 140*g*, and 140*h* have the first, second, third, fourth, fifth, sixth, seventh, and eighth location parameters of $S_1$, $S_2$, $S_3$, $S_4$, $S_5$, $S_6$, $S_7$, and $S_8$, respectively. In this embodiment wherein M is equal to eight, the first, second, third, fourth, fifth, sixth, seventh, and eighth location parameters $S_1$, $S_2$, $S_3$, $S_4$, $S_5$, $S_6$, $S_7$, and $S_8$ are included with the first, second, third, fourth, fifth, sixth, seventh, and eighth sense signals $S_{Sense1}$, $S_{Sense2}$, $S_{Sense3}$, $S_{Sense4}$, $S_{Sense5}$, $S_{Sense6}$, $S_{Sense7}$, and $S_{Sense8}$, respectively. In the embodiment wherein M is equal to three, the first, second, and third location parameters $S_1$, $S_2$, and $S_3$ are included with the first, second, and third sense signals $S_{Sense1}$, $S_{Sense2}$, and $S_{Sense3}$. In the embodiment wherein M is equal to five, the first, second, third, fourth, and fifth location parameters $S_1$, $S_2$, $S_3$, $S_4$, and $S_5$ are included with the first, second, third, fourth, and fifth sense signals $S_{Sense1}$, $S_{Sense2}$, $S_{Sense3}$, $S_{Sense4}$, and $S_{Sense5}$. In general, the $M^{th}$ location parameters $S_1, S_2, \ldots, S_M$ are included with the $M^{th}$ sense signals $S_{Sense1}, S_{Sense2}, \ldots, S_{SenseM}$.

It should be noted that the computer 101 can determine the location parameter of the light sensors in many different ways, such as those discussed in more detail above. For example, the computer can determine the location parameter using GPS, RSSI, triangulation and/or pinging. In some embodiments, the light sensors are integrated with a corresponding lighting system, so that the location parameter of the light sensor corresponds with the location parameter of the lighting system. For example, the first light sensor 140*a* can be integrated with the first lighting system 110*a*, so that the location parameters $P_1$ and $S_1$ are the same, or substantially the same. The first light sensor 140*a* can be integrated with the first lighting system 110*a* in many different ways. For example, the first light sensor 140*a* can be carried by the first lighting system 110*a*. It should be noted that the first sense signal $S_{Sense1}$ can be included with the first communication signal $S_{Comm1}$, if desired.

Figure 3C:
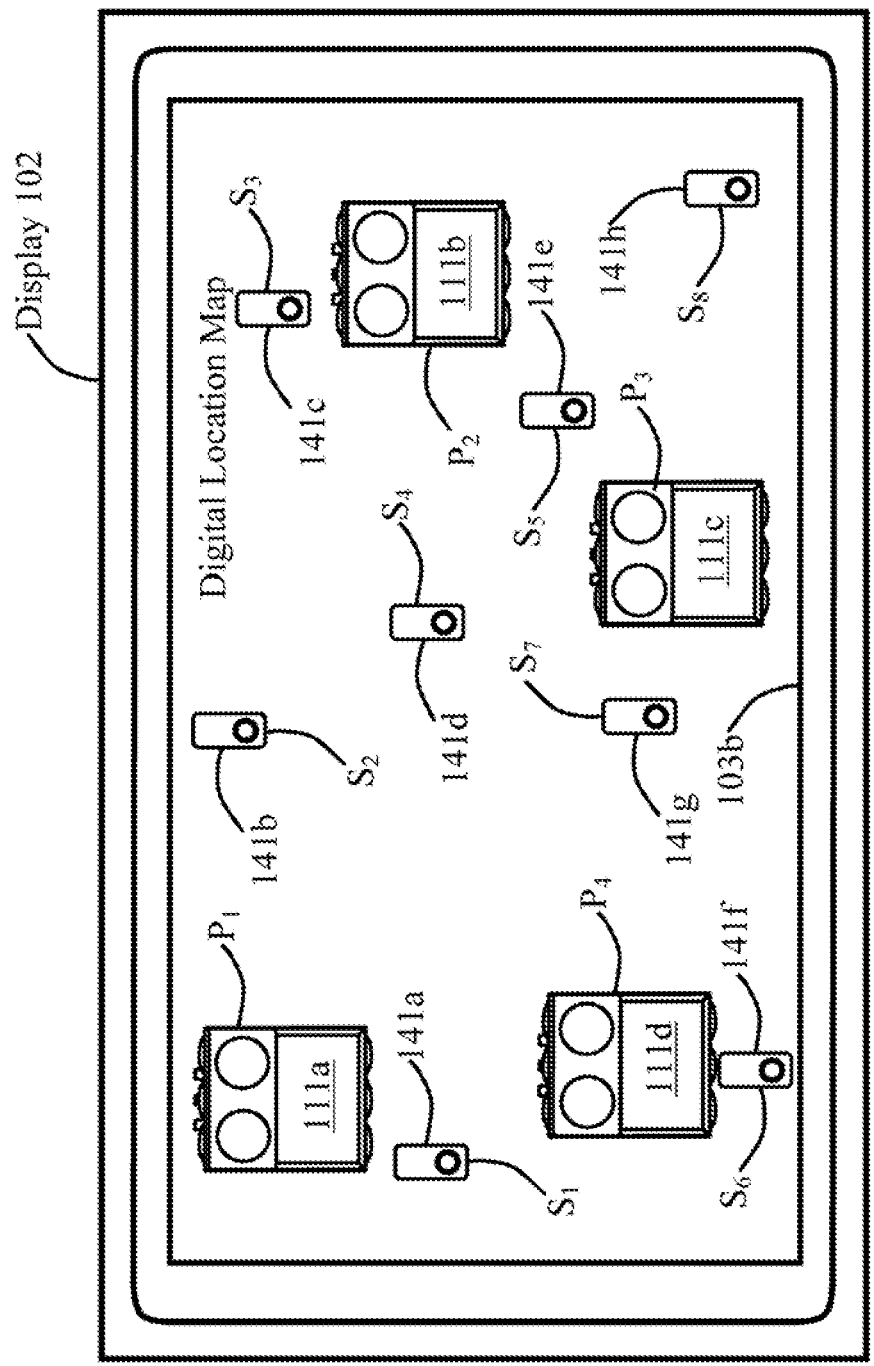
FIG. 3c is a front view of the computer of FIG. 3b, which includes the display of FIG. 2c displaying a digital location map corresponding to FIG. 3b.
Figure 3D:
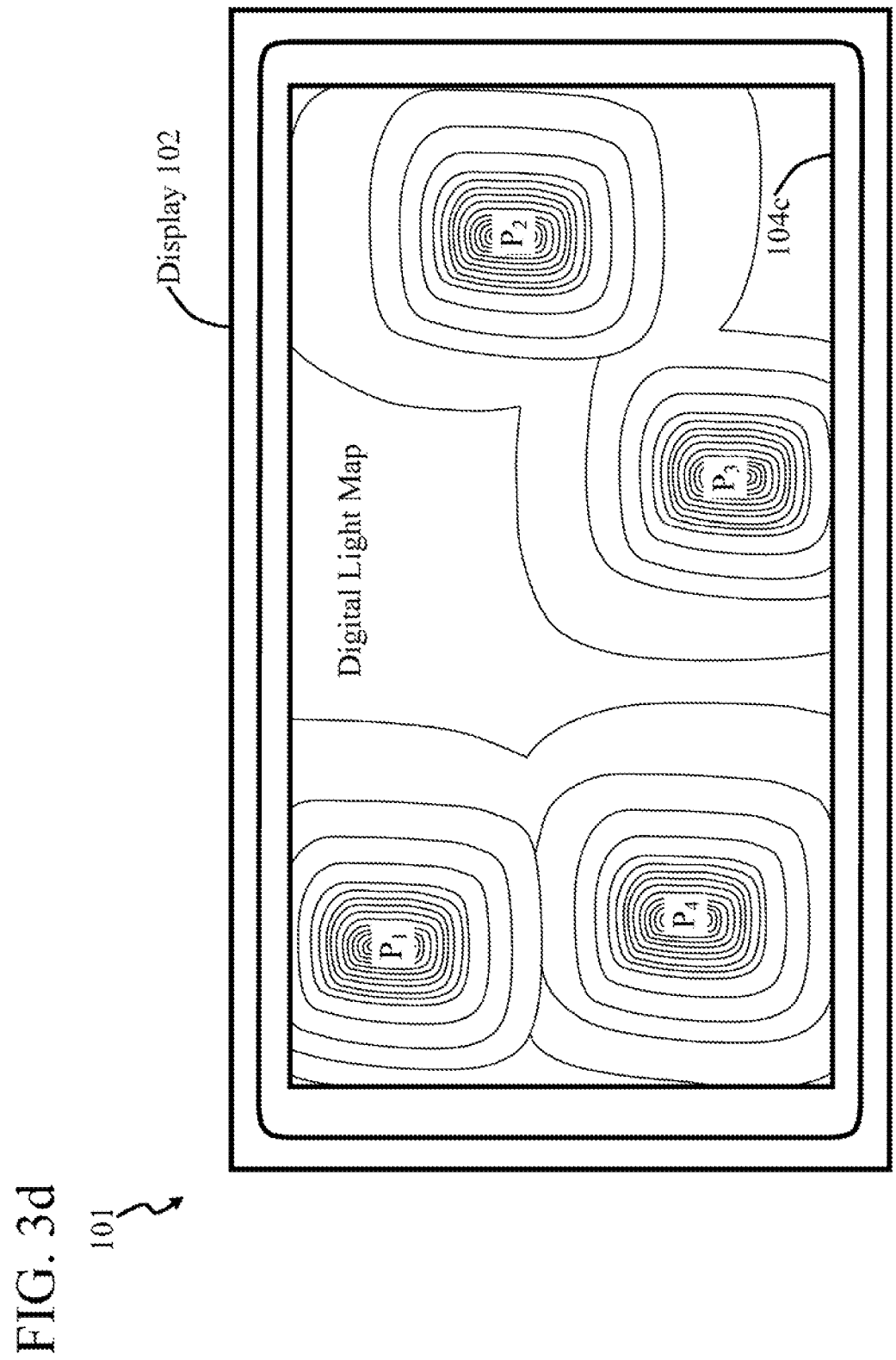
FIG. 3d is a front view of the computer of FIG. 3b, which includes the display of FIG. 2c displaying a digital light map corresponding to FIG. 3b.

FIG. 3*c* is a front view of the computer 101 of FIG. 3*b*, which includes the display 102. As discussed in more detail above, the display 102 can be of many different types, such as one typically included with a computer to display an image.

In this embodiment, the computer 101 provides a digital location map 103*b* corresponding to the location parameters discussed in more detail above. The digital location map 103*b* is displayed by the display 102. The computer 101 can provide the digital location map 103*b* in many different ways, such as those discussed in more detail above. For example, the computer 101 can determine the location parameter using GPS, RSSI, triangulation and/or pinging.

In this embodiment, the digital location map 103*b* corresponds to the positioning of the lighting systems 110*a*, 110*b*, 110*c*, and 110*b* as shown in FIG. 3*b*, wherein the lighting systems 110*a*, 110*b*, 110*c*, and 110*b* have the first, second, third, and fourth location parameters $P_1$, $P_2$, $P_3$, and $P_4$, respectively. The digital location map 103*b* includes the first lighting system icon 111*a* which represents the first lighting system 110*a*, wherein the first lighting system icon 111*a* is represented as being at a position corresponding to the first location parameter $P_1$. The digital location map 103*b* includes the second lighting system icon 111*b* which represents the second lighting system 110*b*, wherein the second lighting system icon 111*b* is represented as being at a position corresponding to the second location parameter $P_2$. The digital location map 103*b* includes the third lighting system icon 111*c* which represents the third lighting system 110*c*, wherein the third lighting system icon 111*c* is represented as being at a position corresponding to the third location parameter $P_3$. The digital location map 103*b* includes the fourth lighting system icon 111*d* which represents the fourth lighting system 110*d*, wherein the fourth lighting system icon 111*d* is represented as being at a position corresponding to the fourth location parameter $P_4$.

As mentioned above, the first, second, third, and fourth lighting system icons 111*a*, 111*b*, 111*c* and 111*d* are graphical representations of the corresponding lighting systems 110*a*, 110*b*, 110*c*, and 110*d*. The lighting system icons 111*a*, 111*b*, 111*c* and 111*d* generally include a pixel, wherein the pixel can include color. The lighting system icons 111*a*, 111*b*, 111*c*, and 111*d* can have an image file format, such as JPEG, TIFF, and BMP.

In this embodiment, the digital location map 103*b* corresponds to the positioning of the first, second, third, fourth, fifth, sixth, seventh, and eighth light sensors 140*a*, 140*b*, 140*c*, 140*d*, 140*e*, 140*f*, 140*g*, and 140*h* as shown in FIG. 3*b*, wherein the first, second, third, fourth, fifth, sixth, seventh, and eighth light sensors 140*a*, 140*b*, 140*c*, 140*d*, 140*e*, 140*f*, 140*g*, and 140*h* have the first, second, third, fourth, fifth, sixth, seventh, and eighth location parameters $S_1$, $S_2$, $S_3$, $S_4$, $S_5$, $S_6$, $S_7$, and $S_8$, respectively. The digital location map 103*b* includes the first light sensor icon 141*a* which represents the first light sensor 140*a*, wherein the first light sensor icon 141*a* is represented as being at a position corresponding to the first location parameter $S_1$. The digital location map 103*b* includes the second light sensor icon 141*b* which represents the second light sensor 140*b*, wherein the second lighting system icon 111*b* is represented as being at a position corresponding to the second location parameter $S_2$. The digital location map 103*b* includes the third light sensor icon 141*c* which represents the third light sensor 140*c*, wherein the third lighting system icon 111*c* is represented as being at a position corresponding to the third location parameter $S_3$. The digital location map 103*b* includes the fourth light sensor icon 141*d* which represents the fourth light sensor 140*d*, wherein the fourth lighting system icon 111*d* is represented as being at a position corresponding to the fourth location parameter $S_4$. The digital location map 103*b* includes the fifth light sensor icon 141*e* which represents the fifth light sensor 140*e*, wherein the fifth lighting system icon 111*e* is represented as being at a position corresponding to the fifth location parameter $S_5$. The digital location map 103*b* includes the sixth light sensor icon 141*f* which represents the sixth light sensor 140*f*, wherein the lighting system icon 111*f* is represented as being at a position corresponding to the sixth location parameter $S_6$. The digital location map 103b includes the seventh light sensor icon 141g which represents the seventh light sensor 140g, wherein the lighting system icon 111g is represented as being at a position corresponding to the seventh location parameter $S_7$. The digital location map 103b includes the eighth light sensor icon 141h which represents the eighth light sensor 140h, wherein the lighting system icon 111h is represented as being at a position corresponding to the eighth location parameter $S_8$.

The first, second, third, fourth, fifth, sixth, seventh, and eighth light sensor icons 141a, 141b, 141c, 141d, 141e, 141f, 141g, and 141h are graphical representations of the corresponding first, second, third, fourth, fifth, sixth, seventh, and eighth light sensor 140a, 140b, 140c, 140d, 140e, 140f, 140g, and 140h. The first, second, third, fourth, fifth, sixth, seventh, and eighth light sensor icons 141a, 141b, 141c, 141d, 141e, 141f, 141g, and 141h generally include a pixel, wherein the pixel can include color. The first, second, third, fourth, fifth, sixth, seventh, and eighth light sensor icons 141a, 141b, 141c, 141d, 141e, 141f, 141g, and 141h can have an image file format, such as JPEG, TIFF, and BMP.

FIG. 3d is a front view of the computer 101, which includes the display 102. In this embodiment, the computer 101 provides a digital light map 104c corresponding to the location parameters discussed in more detail above with FIG. 3c. The digital light map 104c is displayed by display 102.

The computer 101 can provide the digital light map 104c in many different ways, such as those discussed in more detail above. In this embodiment, the digital light map 104c corresponds to the positioning of the lighting systems 110a, 110b, 110c, and 110b as shown in FIG. 3b, wherein the lighting systems 110a, 110b, 110c, and 110b have the first, second, third, and fourth location parameters $P_1$, $P_2$, $P_3$, and $P_4$, respectively. The digital light map 104c includes contour lines which represent the intensity of light provided by the lighting systems 110a, 110b, 110c, and 110b, wherein the intensity of light is provided to the computer 101 by the first, second, third, fourth, fifth, sixth, seventh, and eighth light sensors 140a, 140b, 140c, 140d, 140e, 140f, 140g, and 140h of FIG. 3b. For example, the number and density of contour lights proximate to first location parameter $P_1$ represents the intensity of light provided by the first lighting system 110a. The number and density of contour lights proximate to second location parameter $P_2$ represents the intensity of light provided by the second lighting system 110b. The number and density of contour lights proximate to third location parameter $P_3$ represents the intensity of light provided by the third lighting system 110c. The number and density of contour lights proximate to fourth location parameter $P_4$ represents the intensity of light provided by the fourth lighting system 110d.

The contour lines can be determined by the computer 101 in many different ways, several of which are discussed in more detail below. The computer 101 can be in communication with a light sensor which provides light intensity information. Software operating on the computer 101 can use the light intensity information provided by the light sensor to provide the contour lines. There are many different types of software that can be used, such as imaging software. Some examples of imaging software that can be used include PROSOURCE for light source modeling and TRACEPRO. Other types of software that can be used include building design software. Building design software is generally used to determine the lighting requirements of a building. Some examples of building design software include ECOTECT, RELUX, and RADIANCE. In this way, the computer 101 provides the digital light map 104c corresponding to the amount of light provided by the lighting system array 105.

Disclosed herein are various embodiments of a lighting system which provides many useful functions. The lighting system allows the use of a light sensor array to provide light intensity information to a computer. The intensity of the light provided by the lighting system array in a greenhouse can be adjusted to maintain desired light levels. For example, a lighting system can be driven to provide more light in response to a cloud passing by, as sensed by the light sensor array, and driven to provide less light in response to the cloud moving away.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

The invention claimed is:

1. An apparatus, comprising:
   a computer; and
   a lighting system array operatively in communication with the computer;
   wherein the computer determines a location parameter of each lighting system of the lighting system array, the location parameter corresponding to the location of a corresponding lighting system;
   wherein the computer provides a digital location map corresponding to the location parameters; and
   wherein the digital location map is adjusted in response to adjusting the location of at least one lighting system of the lighting system array.

2. The apparatus of claim 1, wherein the computer provides a digital light map corresponding to the amount of light provided by the lighting system array.

3. The apparatus of claim 2, further including a light sensor array which determines the amount of light provided by the lighting system array, the light sensor array being in communication with the computer.

4. The apparatus of claim 2, wherein the digital light map is driven to a desired digital light map in response to adjusting the location of at least one lighting system of the lighting system array.

5. The apparatus of claim 1, wherein the amount of light provided by at least one lighting system of the lighting system array is adjusted in response to adjusting a selected location parameter.

6. The apparatus of claim 1, wherein the computer determines the location parameter of each lighting system in the lighting system array using a global positioning system indication.

7. The apparatus of claim 1, wherein the computer determines the location parameter of each lighting system in the lighting system array using a radio signal strength indication.

8. The apparatus of claim 1, wherein the computer determines the location parameter of each lighting system in the lighting system array using triangulation.

9. The apparatus of claim 1, wherein the computer determines the location parameter of each lighting system in the lighting system array using network ping response rate.

10. The apparatus of claim 1, wherein the computer determines the location parameter of each lighting system in the lighting system array using a wireless mesh network.

11. The apparatus of claim 1, wherein the computer determines the location parameter of each lighting system in the lighting system array using a wireless personal area network.

12. An apparatus, comprising:
a computer; and
a lighting system array operatively in communication with the computer;
wherein the computer provides a digital light map corresponding to light provided by the lighting system array; and
wherein the computer adjusts the light provided by the lighting system array to drive the digital light map to a desired digital light map.

13. The apparatus of claim 12, further including a light sensor array, wherein the computer provides the digital light map in response to a signal from the light sensor array.

14. The apparatus of claim 12, wherein the computer provides a one dimensional digital light map corresponding to the amount of light provided by the lighting system array.

15. The apparatus of claim 12, wherein the computer provides a two dimensional digital light map corresponding to the amount of light provided by the lighting system array.

16. The apparatus of claim 12, wherein the computer provides a three dimensional digital light map corresponding to the amount of light provided by the lighting system array.

\* \* \* \* \*